(12) United States Patent
Nakagawa et al.

(10) Patent No.: US 10,189,115 B2
(45) Date of Patent: Jan. 29, 2019

(54) LASER PROCESSING APPARATUS AND LASER PROCESSING METHOD

(71) Applicant: MITSUBISHI HEAVY INDUSTRIES, LTD., Tokyo (JP)

(72) Inventors: Kiyotaka Nakagawa, Tokyo (JP); Yoshihito Fujita, Tokyo (JP); Tsugumaru Yamashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 420 days.

(21) Appl. No.: 15/104,627

(22) PCT Filed: Jul. 30, 2014

(86) PCT No.: PCT/JP2014/070122
§ 371 (c)(1),
(2) Date: Jun. 15, 2016

(87) PCT Pub. No.: WO2015/093089
PCT Pub. Date: Jun. 25, 2015

(65) Prior Publication Data
US 2016/0325376 A1    Nov. 10, 2016

(30) Foreign Application Priority Data
Dec. 18, 2013    (JP) ................. 2013-261597

(51) Int. Cl.
*B23K 26/06* (2014.01)
*B23K 26/00* (2014.01)
(Continued)

(52) U.S. Cl.
CPC ...... *B23K 26/0652* (2013.01); *B23K 26/0093* (2013.01); *B23K 26/083* (2013.01);
(Continued)

(58) Field of Classification Search
CPC ......... B23K 26/06; B23K 26/00; B23K 26/38
(Continued)

(56) References Cited

U.S. PATENT DOCUMENTS 4,079,230 A    3/1978   Miyauchi et al.
4,822,974 A *  4/1989   Leighton ............ B23K 26/0652
                                                 219/121.67
(Continued)

FOREIGN PATENT DOCUMENTS

CN    103028843 A    4/2013
JP    2002-372682 A    12/2002
(Continued)

OTHER PUBLICATIONS

English translation of the Written Opinion of the International Searching Authority, dated Nov. 4, 2014, for International Application No. PCT/JP2014/070122.
(Continued)

*Primary Examiner* — Samuel M Heinrich
(74) *Attorney, Agent, or Firm* — Birch, Stewart, Kolasch & Birch, LLP

(57) ABSTRACT

Provided is a laser processing apparatus provided with: a first optical system including a first prism and a second prism; a second optical system including a third prism and a fourth prism; a condensing optical system that condenses laser light to guide the condensed laser light to a workpiece; a first driving device that rotates the first prism and rotates the second prism synchronously with the first prism; a second driving device that rotates the third prism and rotates the fourth prism synchronously with the third prism; and a controller that controls the first driving device and the second driving device such that the workpiece is irradiated with the laser light while the laser light turns. The controller adjusts irradiation conditions of the laser light including an
(Continued)

incidence position and an incidence angle of the laser light with respect to the workpiece, by adjusting a relative position between the first prism and the second prism and a relative position between the third prism and the fourth prism in a rotational direction.

8 Claims, 27 Drawing Sheets

(51) Int. Cl.
    *B23K 26/38*     (2014.01)
    *B23K 26/08*     (2014.01)
    *B23K 37/02*     (2006.01)
    *B23K 26/382*     (2014.01)

(52) U.S. Cl.
    CPC ........ *B23K 26/0876* (2013.01); *B23K 26/389* (2015.10); *B23K 37/0235* (2013.01)

(58) Field of Classification Search
    USPC .......................................... 219/121.7, 121.71
    See application file for complete search history.

(56) References Cited

U.S. PATENT DOCUMENTS 7,009,141 B1 * 3/2006 Wool ................ B23K 26/0096
                                                                        219/121.73

2007/0070480 A1    3/2007  Mahajan et al.
2013/0175243 A1 *  7/2013  Wang ................ B23K 26/0643
                                                                       219/121.7

FOREIGN PATENT DOCUMENTS

| JP | 2004-311818 A | 11/2004 |
|---|---|---|
| JP | 2009-50869 A | 3/2009 |
| JP | 4399107 B2 | 1/2010 |
| JP | 2010-214431 A | 9/2010 |
| JP | 2011-167704 A | 9/2011 |
| JP | 2013-86129 A | 5/2013 |

OTHER PUBLICATIONS

Extended European Search Report dated Dec. 2, 2016 in corresponding European Patent Application No. 14 870 849.8.
Decision of a Patent Grant for JP Application No. 2013-261597, dated Aug. 29, 2014.
International Search Report, issued in PCT/JP2014/070122, dated Nov. 4, 2014.
Notice of Rejection for JP Application No. 2013-261597, dated May 30, 2014.
Written Opinion of the International Searching Authority, issued in PCT/JP2014/070122 (PCT/ISA/237), dated Nov. 4, 2014.

* cited by examiner (A)

(B)

(A)

(B)

(A)

(B)

(A)

(B)

LASER PROCESSING APPARATUS AND LASER PROCESSING METHOD

FIELD

The present invention relates to a laser processing apparatus and a laser processing method.

BACKGROUND

As apparatuses for processing an workpiece, laser processing apparatuses for processing the workpiece with laser light are known as disclosed in Patent Literatures 1, 2, and 3.

CITATION LIST

Patent Literature

Patent Literature 1: Japanese Laid-open Patent Publication No. 4399107
Patent Literature 2: Japanese Laid-open Patent Publication No. 2011-167704
Patent Literature 3: Japanese Laid-open Patent Publication No. 2013-086129

SUMMARY

Technical Problem

For example, during the formation of a hole in a workpiece using a laser processing apparatus, when a hole of an arbitrary shape is not formed with high accuracy, the quality of the workpiece may be degraded.

The present invention has been made to solve the above subject, and an objective thereof is to provide a laser processing apparatus and a laser processing method that can process the workpiece with high quality and high accuracy.

Solution to Problem

In order to solve the above mentioned subject and achieve the objective, there is provided a laser processing apparatus for processing a workpiece using laser light, comprising: a first optical system that includes a first prism and a second prism and receives the laser light output from a laser light source; a second optical system that includes a third prism and a fourth prism and receives the laser light from the first optical system; a condensing optical system that receives the laser light from the second optical system and condenses the laser light to guide the condensed laser light to the workpiece; a first driving device that rotates the first prism and rotates the second prism synchronously with the first prism; a second driving device that rotates the third prism and rotates the fourth prism synchronously with the third prism; and a controller that controls the first driving device and the second driving device such that the workpiece is irradiated with the laser light while the laser light turns around an optical axis of the condensing optical system, wherein the controller adjusts irradiation conditions of the laser light including an incidence position and an incidence angle of the laser light with respect to the workpiece, by adjusting a relative position between the first prism and the second prism and a relative position between the third prism and the fourth prism in a rotational direction.

The controller may rotate the first prism and the third prism together in a state of fixing a relative position between the first prism and the third prism in the rotational direction, adjusts a relative position of the second prism with respect to the first prism and a relative position of the fourth prism with respect to the third prism in the rotational direction, and thus adjusts the irradiation conditions.

The controller may determine the relative position of the second prism with respect to the first prism in the rotational direction such that the incidence angle is a target angle, and rotates the first prism and the second prism together in a state of fixing the determined relative position.

The controller may rotate the fourth prism in one rotation of the third prism while changing the relative position with respect to the third prism.

The laser processing apparatus may comprise a position adjustment device capable of adjusting a relative position between a condensing position of the condensing optical system and the workpiece in a direction parallel to the optical axis.

In order to solve the above mentioned subject and achieve the objective, there is provided a laser processing method for processing a workpiece using laser light, comprising steps of: irradiating the workpiece with the laser light emitted from a laser light source through a first optical system including a first prism and a second prism, a second optical system including a third prism and a fourth prism, and a condensing optical system; and turning the laser light around an optical axis of the condensing optical system by rotating the first prism, the second prism, the third prism, and the fourth prism synchronously with each other, in the step of irradiating, wherein the step of turning the laser light includes adjusting irradiation conditions of the laser light including an incidence position and an incidence angle of the laser light with respect to the workpiece, by adjusting a relative position between the first prism and the second prism and a relative position between the third prism and the fourth prism in a rotational direction.

The adjusting of the irradiation conditions may include adjusting a relative position of the second prism with respect to the first prism and a relative position of the fourth prism with respect to the third prism in the rotational direction, by rotating the first prism and the third prism together in a state of fixing a relative position between the first prism and the third prism in the rotational direction.

The laser processing method may comprise steps of: determining the relative position of the second prism with respect to the first prism in the rotational direction such that the incidence angle is a target angle; and rotating the first prism and the second prism together in a state of fixing the determined relative position.

The laser processing method may comprise a step of rotating the fourth prism in one rotation of the third prism while changing the relative position with respect to the third prism.

The laser processing method may comprise a step of adjusting a relative position between a condensing position of the condensing optical system and the workpiece in a direction parallel to the optical axis.

Advantageous Effects of Invention

According to the present invention, a workpiece can be processed with high quality and high accuracy.

DESCRIPTION OF EMBODIMENTS

Embodiments of the present invention will be described in detail with reference to the drawings. The present invention is not limited by the contents described in the following embodiment. In addition, elements described below include those that can be easily conceived by a person skilled in the art and that are substantially the same. Further, configurations described below can be properly combined. Furthermore, various omissions, displacements, modifications of the configurations can be performed without departing from the scope of the present invention.

In the following description, an XYZ orthogonal coordinate system is established, and the positional relation of respective members is described with reference to the XYZ orthogonal coordinate system. A predetermined direction within a horizontal plane is defined as an X-axis direction, a direction orthogonal to the X-axis direction within the horizontal plane is defined as a Y-axis direction, and a direction orthogonal to each of an X-axis direction and the Y-axis direction (that is, a perpendicular direction) is defined as the Z-axis direction. Rotation (inclination) directions about the X-axis, the Y-axis, and the Z-axis are defined as θX, θY, and θZ directions, respectively. The X-axis is orthogonal to a YZ plane. The Y-axis is orthogonal to an XZ plane. The Z-axis is orthogonal to an XY plane. The XY plane includes the X-axis and the Y-axis. The XZ plane includes the X-axis and the Z-axis. The YZ plane includes the Y-axis and the Z-axis. The XY plane is parallel to the horizontal plane.

First Embodiment

Figure 1:
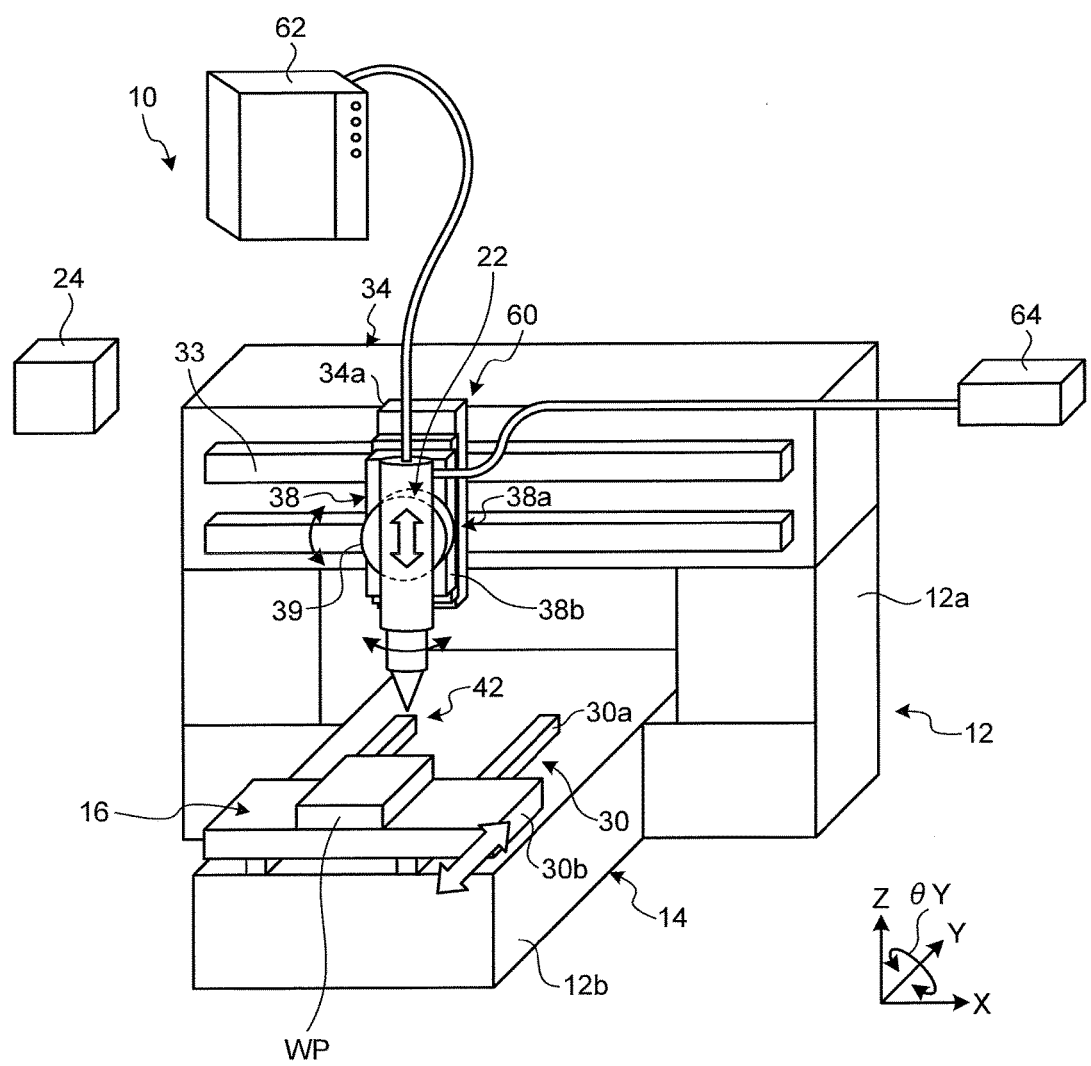
FIG. 1 is a schematic diagram illustrating a schematic configuration of a laser processing apparatus according to an embodiment.

A first embodiment will be described. FIG. 1 is a schematic diagram illustrating a schematic configuration of a laser processing apparatus 10 according to this embodiment. The laser processing apparatus 10 is an apparatus for processing a workpiece WP with laser light L, and can perform various types of processing such as cutting and drilling on the workpiece WP. Processing types are not particularly limited, but the laser processing apparatus 10 according to this embodiment performs cutting work such as drilling or cutting. In addition, the laser processing apparatus 10 also performs measurement of the workpiece WP.

As illustrated in FIG. 1, the laser processing apparatus 10 has a frame 12, a movable unit 14, a stage unit 16, a laser processing unit 22 including a laser processing head 60, and a controller 24. The laser processing apparatus 10 irradiates the workpiece WP held in the stage unit 16 with the laser light L using the laser processing unit 22, and processes the workpiece WP with a laser.

The frame 12 is a housing of the laser processing apparatus 10, and is fixed to an installation surface such as ground or a foundation. The frame 12 has a gate 12 and a foundation 12b inserted into a gate 12a. A fixing part of the movable unit 14 is fixed to the frame 12. The laser processing apparatus 10 is a so-called gate type processing apparatus in which the movable unit 14 is fixed to the gates 12a and the foundation 12b of the frame 12, and the workpiece WP and the laser processing unit 22 are moved relative to each other by the movable unit 14.

The movable unit 14 moves the workpiece WP and the laser processing head 60 relative to each other to adjust a relative position between the workpiece WP and the laser processing head 60. The movable unit 14 has a Y-axis moving mechanism 30, an X-axis moving mechanism 34, a Z-axis moving mechanism 38, and a θY rotating mechanism 39. The Y-axis moving mechanism 30 is arranged on the foundation 12b of the frame 12, and has a rail 30a that extends in the Y-axis direction and a Y-axis moving member 30b that moves along the rail 30a. In the Y-axis moving mechanism 30, the stage unit 16 is fixed to the Y-axis moving member 30b. By moving the Y-axis moving member 30b along the rail 30a, the Y-axis moving mechanism 30 moves the stage unit 16 in the Y-axis direction. The Y-axis moving mechanism 30 is a mechanism that moves the Y-axis moving member 30b in the Y-axis direction, and various mechanisms can be used as this mechanism. For example, a mechanism in which a ball screw is inserted into the Y-axis moving member 30b and the ball screw is rotated by a motor or the like, a linear motor mechanism, a belt mechanism, and the like can be used. As the X-axis moving mechanism 34 and the Z-axis moving mechanism 38, various mechanisms can similarly be used.

The X-axis moving mechanism 34 is arranged on the gate 12a of the frame 12, and has a rail 33 that extends in the X-axis direction, and an X-axis moving member 34a that moves along the rail 33. In the X-axis moving mechanism 34, the Z-axis moving mechanism 38 is fixed to the X-axis moving member 34a. By moving the X-axis moving member 34a along the rail 33, the X-axis moving mechanism 34 moves the Z-axis moving mechanism 38 in the X-axis direction. The Z-axis moving mechanism 38 is fixed to the X-axis moving member 34a, and has a rail 38a extending in the Z-axis direction and a Z-axis moving member 38b moving along the rail 38a. In the Z-axis moving mechanism 38, a θY rotating mechanism 39 is fixed to the Z-axis moving member 38b. By moving the θY rotating mechanism 39 along the rail 38a, the Z-axis moving mechanism 38 moves the θY rotating mechanism 39 in the Z-axis direction. The θY rotating mechanism 39 is fixed to the Z-axis moving member 38b, and has the laser processing head 60 fixed thereto. By rotating the laser processing head 60 in the θY direction with respect to the Z-axis moving member 38b, the θY rotating mechanism 39 rotates the laser processing head 60 in the θY direction.

The movable unit 14 moves the workpiece WP and the laser processing head 60 relative to each other in the X-axis direction, the Y-axis direction, and the Z-axis direction, respectively, using the Y-axis moving mechanism 30, the X-axis moving mechanism 34, and the Z-axis moving mechanism 38. Furthermore, the movable unit 14 rotates the laser processing head 60 with respect to the workpiece WP, using the θY rotating mechanism 39. Accordingly, the direction of the laser light L irradiated from the laser processing head 60 to the workpiece WP can be adjusted. The movable unit 14 may include a mechanism that rotates the laser processing head 60 around the X-axis. In addition, the mechanism that adjusts the direction from which the laser light L is emitted may be provided at the laser processing head 60.

The stage unit 16 is arranged on the Y-axis moving member 30b of the Y-axis moving mechanism 30. The stage unit 16 is a stage that supports the workpiece WP. In the stage unit 16 of this embodiment, a stage of the stage unit 16 is integrated with the Y-axis moving member 30b. However, another supporting member may be provided as a stage on the Y-axis moving member 30b. The stage unit 16 corresponds to a stage moving mechanism 42 in which the Y-axis moving mechanism 30 moves the workpiece WP. The stage unit 16 includes a fixing mechanism that fixes the workpiece WP to a predetermined location on the Y-axis moving member 30b. In addition, the stage unit 16 may further include an adjusting mechanism that adjusts the direction, that is, posture of the workpiece WP with respect to the Y-axis moving member 30b, as the stage moving mechanism 42. Specifically, a mechanism that rotates the workpiece WP may be provided as the stage moving mechanism 42.

The laser processing unit 22 has the laser processing head 60, a fiber laser light source 62, and a short-pulse laser light source 64. The fiber laser light source 62 is a device that outputs laser light with an optical fiber as a medium. As the fiber laser output device, for example, a Fabry-Perot type fiber laser output device or a ring type fiber laser output device can be used, and laser light is excited to be oscillated by in these output devices. As fibers of the fiber laser output device, for example, silica glass to which rare earth elements, such as erbium (Er), neodymium (Nd), and ytterbium (Yb), are added can be used. The short-pulse laser light source 64 outputs laser light in short pulses, for example, at a frequency of 20 kHz. In the short-pulse laser output device, for example, a titanium sapphire laser can be used as an oscillation source of laser light, and can oscillate pulses having a pulse width of 100 picoseconds or less. Furthermore, a laser such as a YAG laser or a YVO4 laser, which performs nanosecond-order pulse oscillation, can also be used. Here, in this embodiment, the short-pulse laser outputs laser light in short pulses having a pulse width of 100 nanoseconds or less. It is preferable that the laser processing unit 22 outputs short-pulse laser light in short pulses having a pulse width of 10 nanoseconds or less, and it is more preferable that the laser processing unit 22 outputs short-pulse laser light having a pulse width of less than 1 nanosecond.

Figure 2:
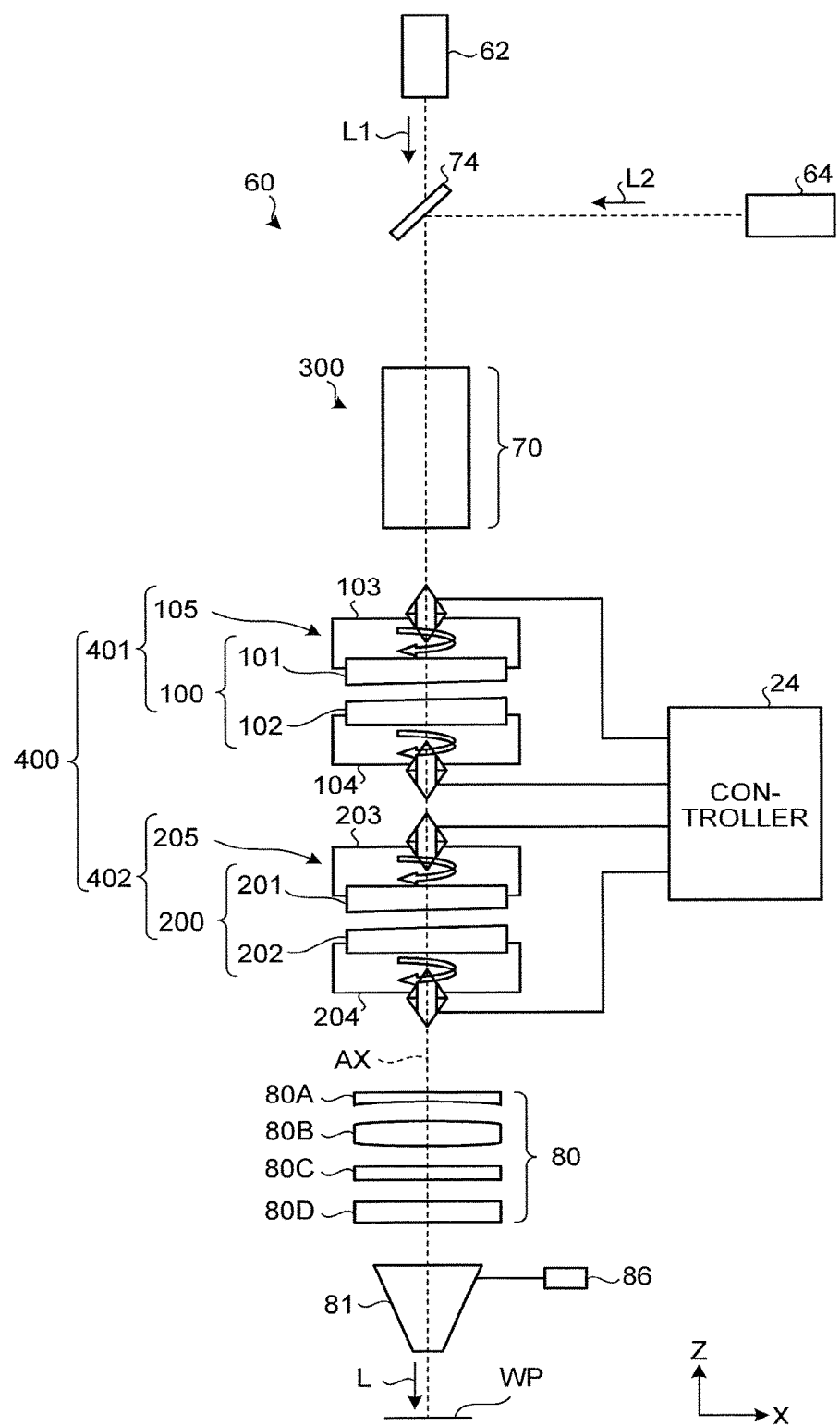
FIG. 2 is a schematic diagram illustrating a schematic configuration of a laser processing head.

Next, the laser processing head 60 will be described. FIG. 2 is a schematic diagram illustrating a schematic configuration of the laser processing head. In this embodiment, the workpiece WP is irradiated with the laser light L including at least one of fiber laser light L1 output from the fiber laser light source 62 and short-pulse laser light L2 output from the short-pulse laser light source 64. Each of the fiber laser light L1 output from the fiber laser light source 62 and the short-pulse laser light L2 output from the short-pulse laser light source 64 is supplied to the laser processing head 60 through a light guiding member such as an optical fiber. As illustrated in FIG. 2, the fiber laser light L1 output from the fiber laser light source 62 and the short-pulse laser light L2 output from the short-pulse laser light source 64 are incident on the laser processing head 60. The laser processing head 60 irradiates the workpiece WP with one of the incident fiber laser light L1 and short-pulse laser light L2, and performs laser processing on the workpiece WP.

The laser processing head 60 includes an optical system 300 having a plurality of optical elements through which the laser light L (at least either of the fiber laser light L1 and the short-pulse laser light L2) passes. The workpiece WP is irradiated with the laser light L through the optical system 300. The optical system 300 includes a half mirror 74 to which the laser light L is supplied from at least either of the fiber laser light source 62 and the short-pulse laser light source 64, a collimating optical system 70 that collimates the laser light L, a first optical system 100 that includes a first prism 101 and a second prism 102 and receives the laser light L from the collimating optical system 70, a second optical system 200 that includes a third prism 201 and a fourth prism 202 and receives the laser light L from the first optical system 100, and a condensing optical system 80 that receives the laser light L from the second optical system 200, condenses the laser light L, and guides the condensed laser light L to the workpiece WP.

Further, the laser processing head 60 includes a first driving device 105 capable of rotating the first prism 101 and the second prism 102 and a second driving device 205 capable of rotating the third prism 201 and the fourth prism 202. In addition, the laser processing head 60 includes a nozzle 81.

In this embodiment, an optical axis of the condensing optical system 80 is parallel to the Z-axis. An optical axis of the collimating optical system 70 is also parallel to the Z-axis. The optical axis of the condensing optical system 80 and the optical axis of the collimating optical system 70 coincide with each other (being coaxial with each other). The first optical system 100 and the second optical system 200 are arranged between the collimating optical system 70 and the condensing optical system 80. The second optical system 200 is arranged closer to the condensing optical system 80 than the first optical system 100. In the following description, the optical axis of the optical system 300 of the laser processing head 60 including the collimating optical system 70 and the condensing optical system 80 is referred to as an optical axis AX as appropriate. In this embodiment, the optical axis AX of the optical system 300 is parallel to the Z-axis.

The half mirror 74 supplies the fiber laser light L1 output from the fiber laser light source 62 and the short-pulse laser light L2 output from the short-pulse laser light source 64 to the collimating optical system 70. The half mirror 74 is arranged at a position on which each of the fiber laser light L1 and the short-pulse laser light L2 can be incident. The half mirror 74 reflects the short-pulse laser light L2 and transmits the fiber laser light L1. The fiber laser light L1 output from the fiber laser light source 62 transmits through the half mirror 74 and is incident on the collimating optical system 70. The short-pulse laser light L2 output from the short-pulse laser light source 64 is reflected by the half mirror 74 and is incident on the collimating optical system 70. In the case of using the half mirror 74, it is preferable that a wavelength of the fiber laser light L1 is separated from a wavelength of the short-pulse laser light L2.

Instead of the half mirror 74, a switching mechanism may be provided which includes a mirror capable of reflecting the short-pulse laser light L2 and a driving part capable of moving the mirror. When the mirror is arranged on a light path of the short-pulse laser light L2 output from the short-pulse laser light source 64, the short-pulse laser light L2 is reflected by the mirror and is supplied to the collimating optical system 70. When the mirror is arranged out of a light path of the fiber laser light L1 output from the fiber laser light source 62, the fiber laser light L1 is supplied to the collimating optical system 70. In this way, the switching mechanism may be provided to switch the laser incident to the collimating optical system 70 between the fiber laser light L1 output from the fiber laser light source 62 and the short-pulse laser light L2 output from the short-pulse laser light source 64.

The collimating optical system 70 has a plurality of optical elements and collimates the laser light L (at least either of the fiber laser light L1 and the short-pulse laser light L2) from the half mirror 74. The laser light L, which is collimated by the collimating optical system 70 and is emitted from the collimating optical system 70, is supplied to the first optical system 100. The laser light L output from at least either of the fiber laser light source 62 and the short-pulse laser light source 64 is supplied to the first optical system 100 through the half mirror 74 and the collimating optical system 70.

The first optical system 100 includes the first prism 101 that receives the laser light L from the collimating optical system 70 and the second prism 102 that receives the laser light L from the first prism 101. The first prism 101 refracts the laser light L emitted from the collimating optical system 70. The second prism 102 refracts again the laser light L supplied from the first prism 101. As the first prism 101 and the second prism, for example, a wedge prism can be used. Each of the first prism 101 and the second prism 102 is rotatable around the axis (Z-axis) parallel to the optical axis AX. That is, each of the first prism 101 and the second prism 102 is rotatable (movable) in the θZ direction. In this embodiment, each of the first prism 101 and the second prism 102 rotates around the optical axis AX.

The first driving device 105 rotates the first prism 101 in the θZ direction and also rotates the second prism 102 in the θZ direction in synchronization with the first prism 101. The first driving device 105 includes an actuator 103 that rotates the first prism 101 and an actuator 104 that rotates the second prism 102. The actuator 103 includes a servo motor, and thus the first prism 101 is rotatable in the θZ direction. The actuator 104 includes a servo motor, and thus the second prism 102 is rotatable in the θZ direction. As the actuator 103 and the actuator 104, for example, a hollow motor can be used.

The second optical system 200 includes the third prism 201 that receives the laser light L from the first optical system 100 and the fourth prism 202 that receives the laser light L from the third prism 201. The third prism 201 refracts the laser light L supplied from the second prism 102. The fourth prism 202 refracts again the laser light L supplied from the third prism 201. As the third prism 201 and the fourth prism 202, for example, a wedge prism can be used. Each of the third prism 201 and the fourth prism 202 is rotatable around the axis (Z-axis) parallel to the optical axis AX. That is, each of the third prism 201 and the fourth prism 202 is rotatable (movable) in the θZ direction. In this embodiment, each of the third prism 201 and the fourth prism 202 rotates around the optical axis AX.

The second driving device 205 rotates the third prism 201 in the θZ direction and also rotates the fourth prism 202 in the θZ direction in synchronization with the third prism 201. The second driving device 205 includes an actuator 203 that rotates the third prism 201 and an actuator 204 that rotates the fourth prism 202. The actuator 203 includes a servo motor, and thus the third prism 201 is rotatable in the θZ direction. The actuator 204 includes a servo motor, and thus the fourth prism 202 is rotatable in the θZ direction. As the actuator 203 and the actuator 204, for example, a hollow motor can be used.

The condensing optical system 80 has the plurality of optical elements, condenses the laser light L from the second optical system 200, and guides the condensed laser light L to workpiece WP. The condensing optical system 80 irradiates the workpiece WP with the laser light L having a predetermined spot diameter. In this embodiment, the condensing optical system 80 includes a first condensing lens 80A having a concave surface, a second condensing lens 80B having a convex surface, a protective glass 80C, and a shield glass 80D. The condensing optical system 80 has preferably a cooling mechanism. The cooling mechanism is, for example, a cooling jacket or the like for cooling the plurality of lenses.

The nozzle 81 has a hollow conical shape of which a diameter decreases toward the traveling direction of the laser light L. The nozzle 81 is mounted on the condensing optical system 80. The nozzle 81 prevents the condensing optical system 80 from being soiled due to a sputter or the like occurring in a processing point of the workpiece WP. In addition, the nozzle 81 is supplied with assist gas from an assist gas supply source 86, and can jet this assist gas toward the workpiece WP.

In this embodiment, as the assist gas, for example, air, nitrogen gas, oxygen gas, argon gas, xenon gas, helium gas, or mixed gases thereof can be used. When the oxygen gas oxidation reaction heat of which can be used for a processing treatment is used as the assist gas, a processing speed for the workpiece WP such as a metal can be further improved. Furthermore, when the nitrogen gas, the argon gas, or the like which suppresses generation of an oxide film as a heat-affected layer is used as the assist gas, processing precision for the workpiece WP such as a metal can be further improved. For example, the types and mixing ratio of the assist gases and the amount (pressure) of the assist gas to be jetted from the nozzle 81 can be changed according to processing conditions, such as a type, processing modes, or the like of workpiece WP.

Additionally, the laser processing unit 22 may include an image capturing means for capturing an image of the laser light incident on the workpiece WP, for example, a camera having a charge coupled device (CCD) image sensor or the like. Accordingly, irradiation conditions of the laser light can be adjusted based on the acquired image.

In this embodiment, the laser processing apparatus 10 has an adjustment device 400 that adjusts irradiation conditions (incident conditions) of the laser light L which include an incidence position and an incidence angle of the laser light L with respect to the workpiece WP. The adjustment device 400 has a first adjustment section 401 including the first optical system 100 and the first driving device 105, and a second adjustment section 402 including the second optical system 200 and the second driving device 205. The first driving device 105 and the second driving device 205 are controlled by the controller 24. The controller 24 controls the first driving device 105 and the second driving device 205 such that the workpiece WP is irradiated with the laser light L while the laser light L turns around the optical axis of the condensing optical system 80.

The first adjustment section 401 can adjust an incidence angle of the laser light L incident on the workpiece WP. In this embodiment, the front of the workpiece WP is parallel to the XY-plane, and the first adjustment section 401 can adjust the incidence angle of the laser light L with respect to the front of the workpiece WP. The first adjustment section 401 may be referred to as a laser-light-incident-angle adjustment section 401. By the change of the relative position between the first prism 101 and the second prism 102, the incidence angle of the laser light L with respect to the workpiece WP is changed. The first adjustment section 401 adjusts the relative position (difference in phase angle) between the first prism 101 and the second prism 102 in the θZ direction (rotational direction), and thus can adjust the incidence angle of the laser light L incident on the workpiece WP.

The second adjustment section 402 can adjust the incidence position of the laser light L incident on the workpiece WP. In this embodiment, the front of the workpiece WP is parallel to the XY-plane, and the second adjustment section 402 can adjust the incidence position (irradiation position) of the laser light L in the plane parallel to the front of the workpiece WP. The second adjustment section 402 may be referred to as a laser-light-turning-radius adjustment section 402. By the change of the relative position between the third prism 201 and the fourth prism 202, the incidence position of the laser light L with respect to the workpiece WP is changed. The second adjustment section 402 adjusts the relative position (difference in phase angle) between the third prism 201 and the fourth prism 202 in the θZ direction (rotational direction), and thus can adjust the incidence position of the laser light L incident on the workpiece WP.

Figure 3:
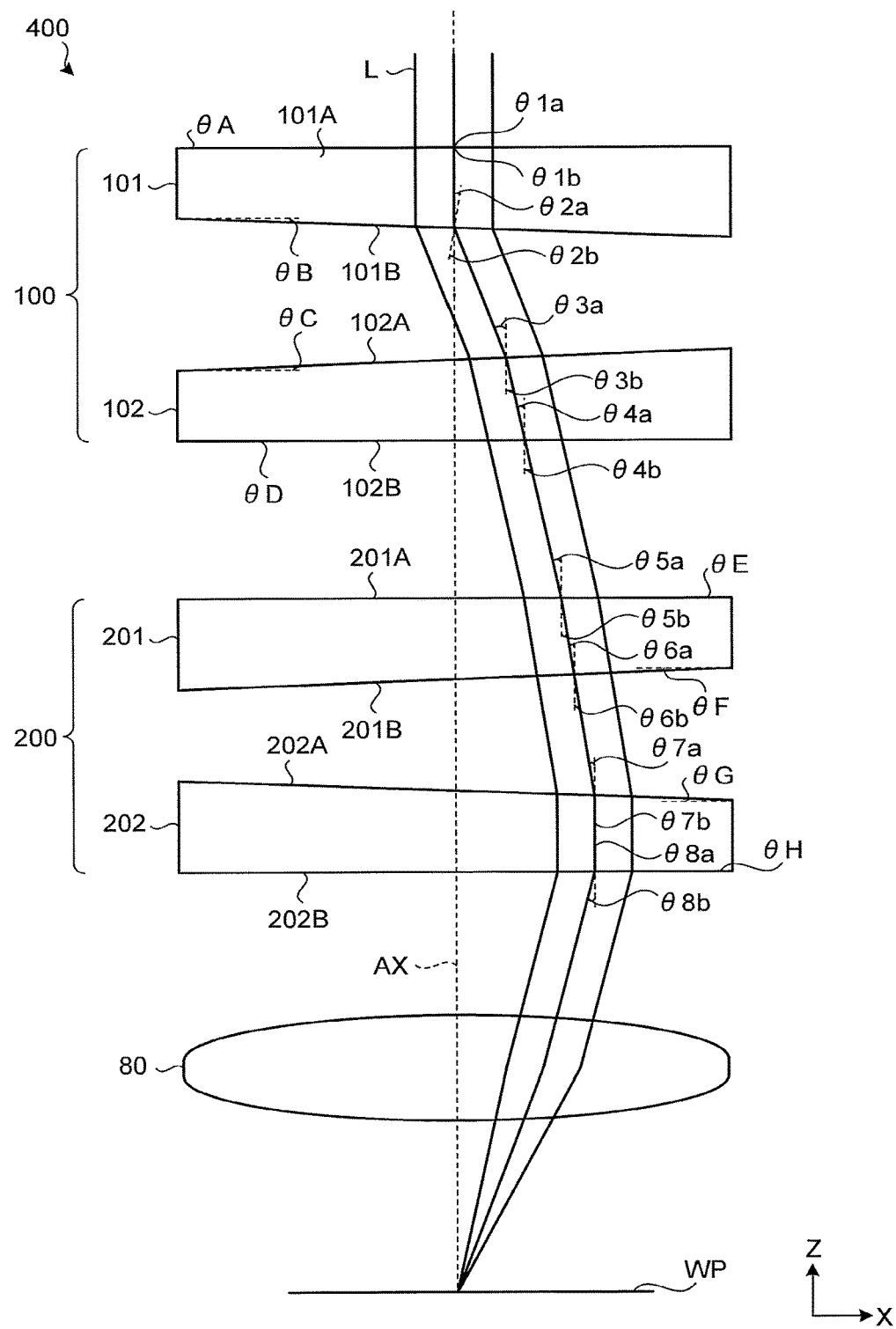
FIG. 3 is a diagram illustrating an optical system of an adjustment device.

FIG. 3 is a diagram illustrating an example of the optical system of the adjustment device 400. The optical system of the adjustment device 400 includes the first prism 101, the second prism 102, the third prism 201, and the fourth prism 202.

The first prism 101 includes an incidence surface 101A on which the laser light L is incident from the collimating optical system 70 and an emission surface 101B from which the laser light L incident from the incidence surface 101A is emitted. The second prism 102 includes an incidence surface 102A on which the laser light L is incident from the first prism 101 and an emission surface 102B from which the laser light L incident from the incidence surface 102A is emitted. The third prism 201 includes an incidence surface 201A on which the laser light L is incident from the second prism 102 and an emission surface 201B from which the laser light L incident from the incidence surface 201A is emitted. The fourth prism 202 includes an incidence surface 202A on which the laser light L is incident from the third prism 201 and an emission surface 202B from which the laser light L incident from the incidence surface 202A is emitted.

The incidence surface 101A is a flat surface. An angle between the incidence surface 101A and the XY-plane is an angle of θA. In this embodiment, the incidence surface 101A is parallel to the XY-plane, and is vertical to the optical axis AX (Z-axis). That is, the angle θA is 0°. In this embodiment, the laser light L is incident vertically on the incidence surface 101A from the collimating optical system 70. Incidentally, the incidence surface 101A may be slightly inclined with respect to the XY-plane. For example, the angle θA may be less than 1°.

The emission surface 101B is a flat surface, and is inclined with respect to the incidence surface 101A. An angle between the emission surface 101B and the XY-plane is an angle of θB, and the emission surface 101B is inclined with respect to the XY-plane. The laser light L is refracted in the emission surface 101B, and advances obliquely to the optical axis AX.

The incidence surface 102A is a flat surface. An angle between the incidence surface 102A and the XY-plane is an angle of θC, and the incidence surface 102A is inclined with respect to the XY-plane. The emission surface 101B and the incidence surface 102A face each other through a gap. The angle θB and the angle θC may be equal to each other, or may be different from each other. When the angle θB and the angle θC are equal to each other, by adjustment of the relative position between the first prism 101 and the second prism 102 in the θZ direction, the incidence surface 102A may be inclined with respect to the emission surface 101B or may be parallel thereto. The laser light L is refracted in the incidence surface 102A.

The emission surface 102B is a flat surface, and is inclined with respect to the incidence surface 102A. An angle between the emission surface 102B and the XY-plane is an angle of θD. In this embodiment, the emission surface 102B is parallel to the XY-plane and is vertical to the optical axis AX (Z-axis). That is, the angle θD is 0°. Incidentally, the emission surface 102B may be slightly inclined with respect to the XY-plane. For example, the angle θD may be less than 1°. The laser light L is refracted in the emission surface 102B.

The incidence surface 201A is a flat surface. An angle between the incidence surface 201A and the XY-plane is an angle of θE. In this embodiment, the incidence surface 201A is parallel to the XY-plane and is vertical to the optical axis AX (Z-axis). That is, the angle θE is 0°. Incidentally, the incidence surface 201A may be slightly inclined with respect to the XY-plane. For example, the angle θE may be less than 1°. In the example illustrated in FIG. 3, the laser light L is incident obliquely on the incidence surface 201A from the prism 102. The emission surface 102B and the incidence surface 201A face each other through a gap. The laser light L is refracted in the incidence surface 201A.

The emission surface 201B is a flat surface, and is inclined with respect to the incidence surface 201A. An angle between the emission surface 201B and the XY-plane is an angle of θF, and the emission surface 201B is inclined with respect to the XY-plane. The laser light L is refracted in the emission surface 201B.

The incidence surface 202A is a flat surface. An angle between the incidence surface 202A and the XY-plane is an angle of θG, and the incidence surface 202A is inclined with respect to the XY-plane. The emission surface 201B and the incidence surface 202A face each other through a gap. The angle θF and the θG may be equal to each other, or may be different from each other. When the θF and the angle θG are equal to each other, by adjustment of the relative position between the third prism 201 and the fourth prism 202 in the θZ direction, the incidence surface 202A may be inclined with respect to the emission surface 201B or may be parallel thereto. The laser light L is refracted in the incidence surface 202A.

The emission surface 202B is a flat surface. An angle between the emission surface 202B and the XY-plane is an angle of θH. In this embodiment, the emission surface 202B is parallel to the XY-plane and is vertical to the optical axis AX (Z-axis). That is, the angle θH is 0°. Incidentally, the emission surface 202B may be slightly inclined with respect to the XY-plane. For example, the angle θH may be less than 1°. The laser light L is refracted in the emission surface 202B.

In FIG. 3, the laser light L is incident on the incidence surface 101A of the first prism 101 at an incidence angle θ1a, and is incident on the first prism 101 from the incidence surface 101A at a refraction angle θ1b. The laser light L travelled through the first prism 101 is incident on the emission surface 101B at an incidence angle θ2a, and is emitted from the emission surface 101B at a refraction angle θ2b. The laser light L emitted from the emission surface 101B is incident on the incidence surface 102A of the second prism 102 at an incidence angle θ3a, and is incident on the second prism 102 from the incidence surface 102A at a refraction angle θ3b. The laser light L travelled through the second prism 102 is incident on the emission surface 102B at an incidence angle θ4a, and is emitted from the emission surface 102B at a refraction angle θ4b. The laser light L emitted from the emission surface 102B is incident on the incidence surface 201A of the third prism 201 at an incidence angle θ5a, and is incident on the third prism 201 from the incidence surface 201A at a refraction angle θ5b. The laser light L travelled through the third prism 201 is incident on the emission surface 201B at an incidence angle θ6a, and is emitted from the emission surface 201B at a refraction angle θ6b. The laser light L emitted from the emission surface 201B is incident on the incidence surface 202A of the fourth prism 202 at an incidence angle θ7a, and is incident on the fourth prism 202 from the incidence surface 202A at a refraction angle θ7b. The laser light L travelled through the fourth prism 202 is incident on the emission surface 202B at an incidence angle θ8a, and is emitted from the emission surface 202B at a refraction angle θ8b.

After the laser light L emitted from the emission surface 202B is condensed by the condensing optical system 80, the workpiece WP is irradiated with the laser light L. In the example illustrated in FIG. 3, by the passing of the laser light L through the first prism 101, the second prism 102, the third prism 201, and the fourth prism 202, the laser light L emitted from the emission surface 202B advances in a direction inclined with respect to the optical axis AX. When the front of the workpiece WP is parallel to the XY-plane, the laser light L is incident obliquely to the front of the workpiece WP.

Figure 4:
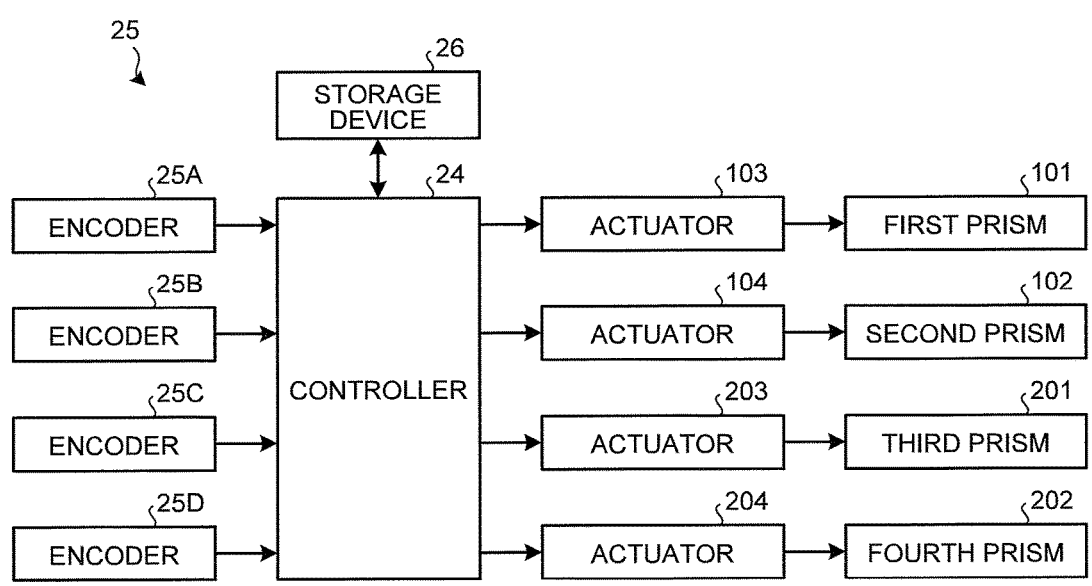
FIG. 4 is a control block diagram of the adjustment device.

FIG. 4 is a diagram illustrating an example of a control block diagram of the adjustment device 400 according to this embodiment. In this embodiment, the laser processing apparatus 10 includes a position detection device 25 that can detect a position of the respective four prisms 101, 102, 201, and 202 in the θZ direction and a storage device 26 that stores a relation (table) between a target shape of a hole formed in the workpiece WP and a target position of the respective four prisms 101, 102, 201, and 202 in the θZ direction for the purpose of forming the hole of the target shape. The controller 24 controls a drive amount and a drive speed of respective four actuators 103, 104, 203, and 204 based on storage information of the storage device 26 and the detection result of the position detection device 25. For example, when the drive amount of the actuator 204 is controlled, the movement amount (rotation amount, rotation angle) of the fourth prism 202 in the θZ direction is controlled, and when the drive speed of the actuator 204 is controlled, the movement speed (rotation speed) of the fourth prism 202 in the θZ direction is controlled. The same also applies to the actuators 103, 104, and 203.

The position detection device 25 includes an encoder 25A that detects the movement amount of the first prism 101, an encoder 25B that detects the movement amount of the second prism 102, an encoder 25C that detects the movement amount of the third prism 201, and an encoder 25D that detects the movement amount of the fourth prism 202, in the θZ direction with respect to a reference position. Using the encoders 25A, 25B, 25C, and 25D, the position detection device 25 can detect the position of the respective first to fourth prisms 101, 102, 201, and 202 in the θZ direction. Detection results of the position detection device 25 are output to the controller 24. The controller 24 controls the actuators 103, 104, 203, and 204 based on the detection results of the position detection device 25, such that the respective four prisms 101, 102, 201, and 202 are arranged at the target position with respect to the reference position. In addition, based on the detection results of the position detection device 25, the controller 24 obtains the movement amount of the respective four prisms 101, 102, 201, and 202 per unit time, and can obtain the movement speed of the respective four prisms 101, 102, 201, and 202 in the θZ direction, based on the movement amount.

The storage device 26 stores the information on the target position of the respective four prisms 101, 102, 201, and 202 for forming the hole of the target shape in the workpiece WP. A relation between the target shape of the hole and the target position of the respective four prisms 101, 102, 201, and 202 for forming the hole of the target shape can be determined by one or both of a preliminary experiment and a simulation. The controller 24 controls each of the four actuators 103, 104, 203, and 204 based on the information on the target position of the respective four prisms 101, 102, 201, and 202 and a detection result of the respective four encoders 25A, 25B, 25C, and 25D, such that the hole of the target shape is formed in the workpiece WP. In other words, the controller 24 determines the rotation conditions (movement conditions, position conditions) of the respective four prisms 101, 102, 201, and 202 including the relative position (difference in phase angle) of the four prisms 101, 102, 201, and 202 in the θZ direction, the rotation amount of the respective four prisms 101, 102, 201, and 202, and the rotation speed of the respective four prisms 101, 102, 201, and 202, based on the storage information of the storage device 26, such that the hole of the target shape is formed in the workpiece WP. The controller 24 controls the respective four actuators 103, 104, 203, and 204 such that the four prisms 101, 102, 201, and 202 rotate (move) based on the determined rotation conditions.

Figure 5:
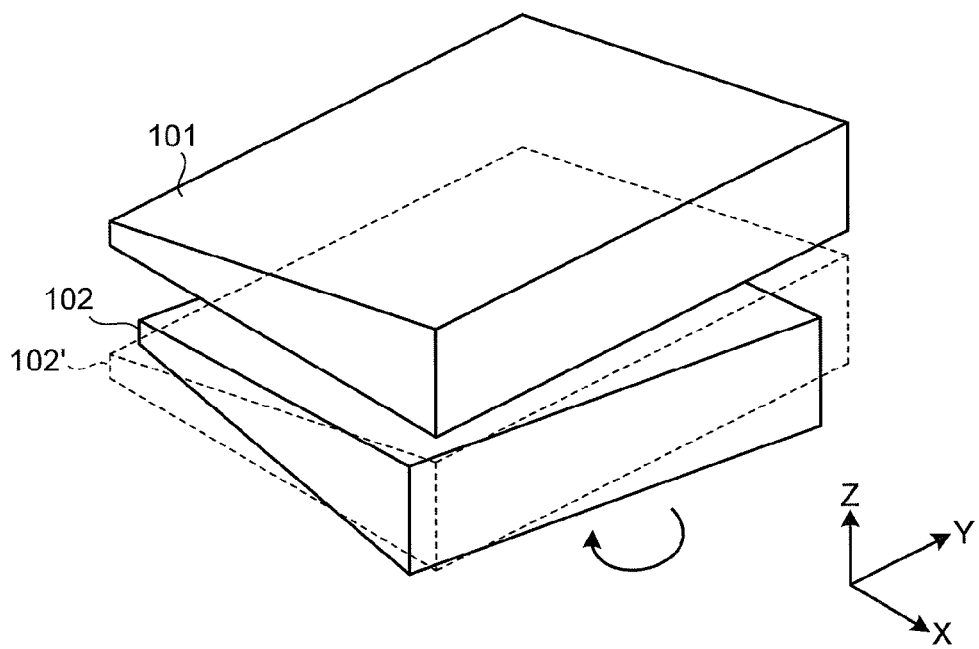
FIG. 5 is an explanatory diagram for describing an operation of a first prism and a second prism.

FIG. 5 is a schematic diagram illustrating an example of an operation of the first prism 101 and the second prism 102. As illustrated in FIG. 5, the controller 24 controls the first driving device 105 and thus can change the relative position between the first prism 101 and the second prism 102 in the θZ direction (rotational direction). For example, the controller 24 can rotate the second prism 102 with respect to the first prism 101 from a position (see reference numeral 102') indicated by a broken line to a position (see reference numeral 102) indicated by a solid line in FIG. 5. For example, the controller 24 can change the relative position between the first prism 101 and the second prism 102 in the θZ direction by rotating the first prism 101 at a first speed in the θZ direction and rotating the second prism 102 at a second speed different from the first speed in at least a part of a period during which the first prism 101 rotates. Naturally, the controller 24 can rotate once or multiple times the second prism 102 with respect to the first prism 101 in the θZ direction.

Figure 6:
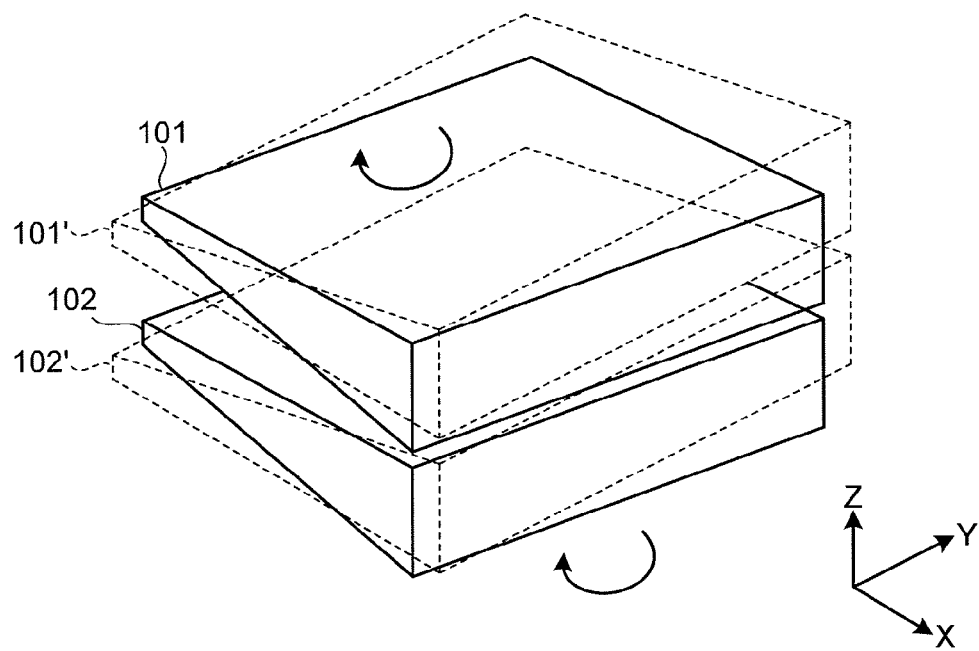
FIG. 6 is an explanatory diagram for describing an operation of the first prism and the second prism.

FIG. 6 is a schematic diagram illustrating an example of an operation of the first prism 101 and the second prism 102. As illustrated in FIG. 6, the controller 24 controls the first driving device 105 and thus can rotate the first prism 101 and the second prism 102 together in a state of fixing the relative position between the first prism 101 and the second prism 102 in the θZ direction (rotational direction). For example, the controller 24 can rotate the first prism 101 and the second prism 102 together from positions (see reference numerals 101' and 102') indicated by a broken line to positions (see reference numerals 101 and 102) indicated by a solid line in FIG. 6. Naturally, the controller 24 can rotate once or multiple times the first prism 101 and the second prism 102 in the θZ direction.

With reference to FIGS. 5 and 6, an example of the operation of the first prism 101 and the second prism 102 was is described. As in the first prism 101 and the second prism 102, the controller 24 can change the relative position between the third prism 201 and the fourth prism 202 in the θZ direction (rotational direction), and can rotate the third prism 201 and the fourth prism 202 together in a state of fixing the relative position between the third prism 201 and the fourth prism 202 in the θZ direction. In addition, the controller 24 can rotate independently each of the first prism 101, the second prism 102, the third prism 201, and the fourth prism 202.

In FIGS. 5 and 6, the first and second prisms 101 and 102 are angular wedge prisms as an example, but may be round wedge prisms.

Figure 7:
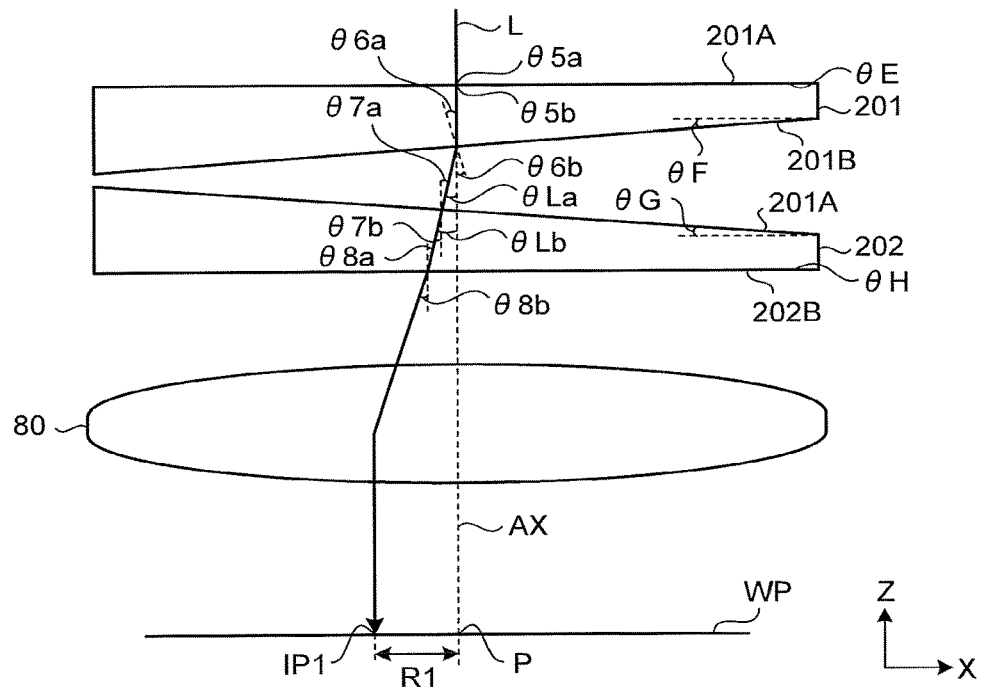
FIG. 7 is an explanatory diagram for describing an operation of a third prism and a fourth prism.
Figure 8:
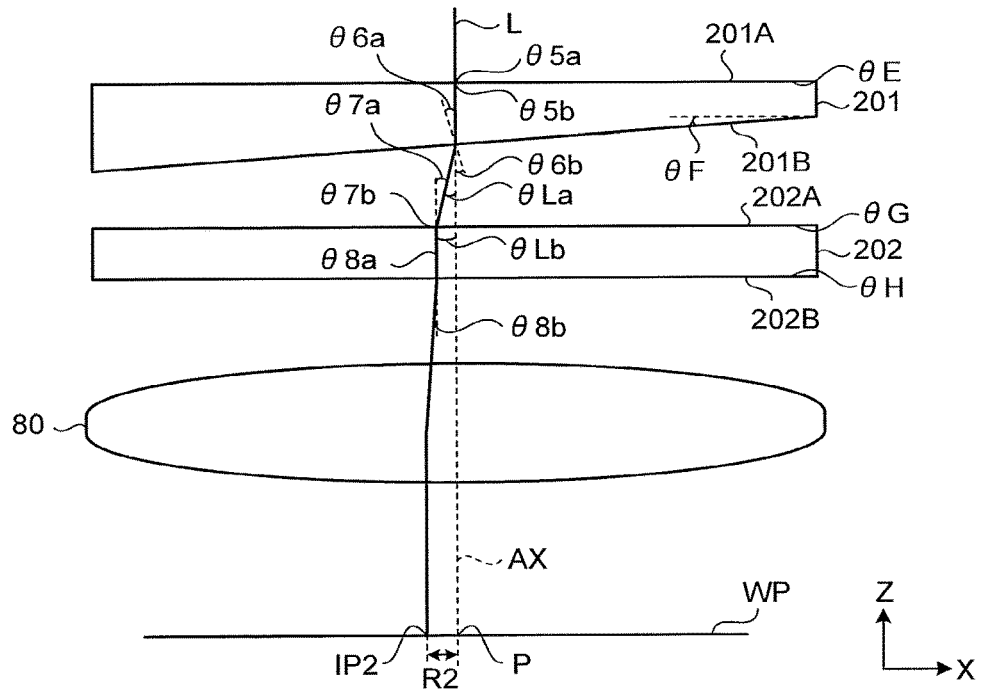
FIG. 8 is an explanatory diagram for describing an operation of the third prism and the fourth prism.

FIGS. 7 and 8 are schematic diagrams illustrating an example of irradiation conditions (incident conditions) of the laser light L with respect to the workpiece WP when the fourth prism 202 is relatively moved to the third prism 201 in the θZ direction. In the FIGS. 7 and 8, for ease of description, an example is described in which the laser light L is vertically incident on the incidence surface 201A of the third prism 201. That is, in the examples illustrated in FIGS. 7 and 8, the incidence angle θ5a of the laser light L incident on the incidence surface 201A of the third prism 201 is 0°. In addition, the refraction angle θ5b of the laser light L incident on the incidence surface 201A of the third prism 201 is also 0°. For convenience, FIGS. 7 and 8 also illustrate an example in which the laser light L passes through the XZ-plane.

As illustrated in FIG. 7, when the relative position between the third prism 201 and the fourth prism 202 in the θZ direction is a first condition, the angle θE between the XY-plane and the incidence surface 201A of the third prism 201 is 0° in the plane (in the XZ-plane) through which the laser light L passes, the angle θF between the XY-plane and the emission surface 201B of the third prism 201 is a first angle, the angle θG between the XY-plane and the incidence surface 202A of the fourth prism 202 is a second angle different from the first angle, and the angle θH between the XY-plane and the emission surface 202B of the fourth prism 202 is 0°. Each of the first angle and the second angle is greater than 0° and smaller than 90°. In the example illustrated in FIG. 7, the emission surface 201B is inclined such that an end of the emission surface 201B on the −X side is arranged closer to the −Z side than an end on the +X side. The incidence surface 202A is inclined such that an end of the incidence surface 202A on the −X side is arranged closer to the +Z side than an end on the +X side.

In FIG. 7, the laser light L incident on the incidence surface 201A of the third prism 201 is emitted from the emission surface 201B of the third prism 201. The emission surface 201B of the third prism 201 is inclined with respect to the XY-plane, and after being incident on the emission surface 201B at the incidence angle θ6a, the laser light L is emitted from the emission surface 201B at the refraction angle θ6b depending on the incidence angle θ6a. An angle θLa (a traveling direction of the laser light L to be emitted from the emission surface 201B) between the Z-axis parallel to the optical axis AX and the laser light L to be emitted from the emission surface 201B is changed depending on the inclination angle θF of the emission surface 201B and the incidence angle θ6a of the laser light L with respect to the emission surface 201B of the laser light L.

The laser light L emitted from the emission surface 201B of the third prism 201 is incident on the incidence surface 202A of the fourth prism 202 at the incidence angle θ7a depending on the refraction angle θ6b (the angle θLa between the Z-axis and the laser light L to be emitted from the emission surface 201B). The incidence surface 202A of the fourth prism 202 is inclined with respect to the XY-plane, and after being incident on the incidence surface 202A at the incidence angle θ7a, the laser light L is incident on the fourth prism 202 at the refraction angle θ7b depending on the incidence angle θ7a. An angle θLb (a traveling direction of the laser light L incident from the incidence surface 202A) between the Z-axis and the laser light L incident on the fourth prism 202 from the incidence surface 202A is changed depending on the inclination angle θG of the incidence surface 202A and the incidence angle θ7a of the laser light L with respect to the incidence surface 202A. After being incident on the emission surface 202B of the fourth prism 202 at the incidence angle θ8a, the laser light L travelled through the fourth prism 202 is emitted from the emission surface 202B at the refraction angle θ8b depending on the incidence angle θ8a.

The front of the workpiece WP is irradiated with the laser light L emitted from the emission surface 202B of the fourth prism 202 through the condensing optical system 80. On the front of the workpiece WP, the irradiation of the laser light L is performed on a position IP1 separated by a first distance R1 from an intersection point P between the optical axis of the condensing optical system 80 and the front of the workpiece WP.

As illustrated in FIG. 8, when the relative position between the third prism 201 and the fourth prism 202 in the θZ direction is a second condition, the angle θE between the XY-plane and the incidence surface 201A of the third prism 201 is 0° in the plane (in the XZ-plane) through which the laser light L passes, the angle θF between the XY-plane and the emission surface 201B of the third prism 201 is a first angle, the angle θG between the XY-plane and the incidence surface 202A of the fourth prism 202 is a third angle different from the first angle and the second angle, and the angle θH between the XY-plane and the emission surface 202B of the fourth prism 202 is 0°. Each of the first angle and the third angle is greater than 0° and smaller than 90°.

In FIG. 8, the laser light L incident on the incidence surface 201A of the third prism 201 is emitted from the emission surface 201B of the third prism 201. The emission surface 201B of the third prism 201 is inclined with respect to the XY-plane, and after being incident on the emission surface 201B at the incidence angle θ6a, the laser light L is emitted from the emission surface 201B at the refraction angle θ6b depending on the incidence angle θ6a. The angle θLa (the traveling direction of the laser light L to be emitted from the emission surface 201B) between the Z-axis and the laser light L to be emitted from the emission surface 201B is changed depending on the inclination angle θF of the emission surface 201B and the incidence angle θ6a of the laser light L with respect to the emission surface 201B.

The laser light L emitted from the emission surface 201B of the third prism 201 is incident on the incidence surface 202A of the fourth prism 202 at the incidence angle θ7a depending on the refraction angle θ6b (the angle θLa between the Z-axis and the laser light L to be emitted from the emission surface 201B). The incidence surface 202A of the fourth prism 202 is inclined with respect to the XY-plane, and after being incident on the incidence surface 202A at the incidence angle θ7a, the laser light L is incident on the fourth prism 202 at the refraction angle θ7b depending on the incidence angle θ7a. An angle θLb (a traveling direction of the laser light L incident from the incidence surface 202A) between the Z-axis and the laser light L incident on the fourth prism 202 from the incidence surface 202A is changed depending on the inclination angle θG of the incidence surface 202A and the incidence angle θ7a of the laser light L with respect to the incidence surface 202A. After being incident on the emission surface 202B of the fourth prism 202 at the incidence angle θ8a, the laser light L travelled through the fourth prism 202 is emitted from the emission surface 202B at the refraction angle θ8b depending on the incidence angle θ8a.

The front of the workpiece WP is irradiated with the laser light L emitted from the emission surface 202B of the fourth prism 202 through the condensing optical system 80. On the front of the workpiece WP, the irradiation of the laser light L is performed on a position IP2 separated by a second distance R2, which is different from the first distance R1, from the intersection point P between the optical axis of the condensing optical system 80 and the front of the workpiece WP.

In this way, the position (emission position) of the laser light L to be emitted from the emission surface 202B, that is, the irradiation position IP (the distance R separated from the intersection point P) of the laser light L on the front of the workpiece WP is changed depending on the incidence angle θ6a and the refraction angle θ6b at the emission surface 201B, the incidence angle θ7a and the refraction angle θ7b at the incidence surface 202A, the incidence angle θ8a and the refraction angle θ8b at the emission surface 202B, the inclination angle θF of the emission surface 201B, and the inclination angle θG of the incidence surface 202A, in the portions of the respective third prism 201 and the fourth prism 202 through which the laser light L passes (in the plane through which the laser light L passes). The incidence angle θ6a, the refraction angle θ6b, the incidence angle θ7a, the refraction angle θ7b, and the inclination angles θF and θG in these portions through which the laser light L passes can be changed by the change of the relative position of the fourth prism 202 with respect to the third prism 201 in the θZ direction. In this embodiment, by the continuous change of the relative position of the fourth prism 202 with respect to the third prism 201 in the θZ direction, the distance R between the intersection point P and the irradiation position IP of the laser light L can be continuously changed.

Figure 9:
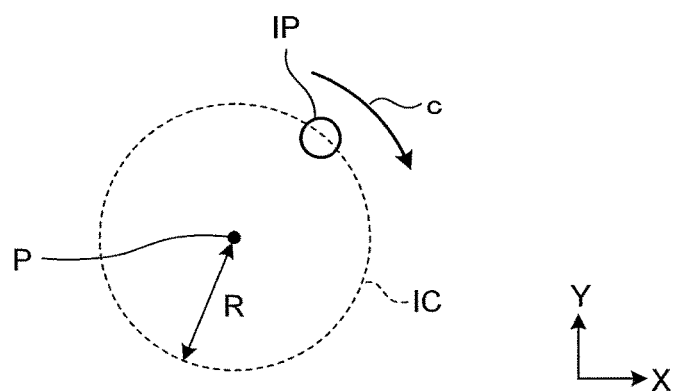
FIG. 9 is an explanatory diagram for describing an operation of the laser processing head.
Figure 10:
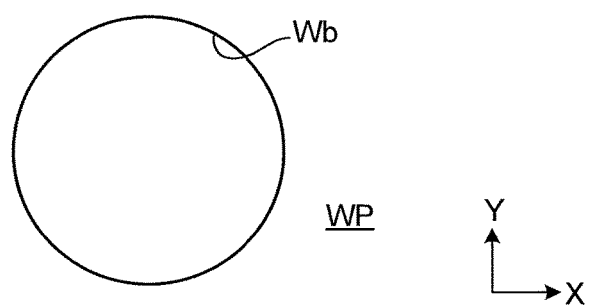
FIG. 10 is a schematic diagram illustrating an example a processed workpiece.

In addition, when the third prism 201 and the fourth prism 202 rotate together in a state where the relative position between the third prism 201 and the fourth prism 202 in the θZ direction is fixed, the irradiation position (incidence position) IP of the laser light L can turn around the intersection point P (the optical axis of the condensing optical system 80) as illustrated in the schematic diagram of FIG. 9 (see an arrow indicated by "c"). That is, the laser light L turns around the intersection point (center) P, and the irradiation position IP of the laser Light L moves on a virtual circle IC having the center P as a turning center, whereby a circular hole Wb in the XY-plane can be formed in the workpiece WP as illustrated in FIG. 10. The size (radius) of the hole Wb can be adjusted by adjustment of the distance (turning radius) R.

Figure 11:
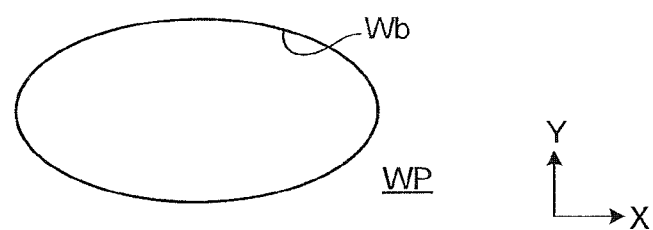
FIG. 11 is a schematic diagram illustrating an example of a processed workpiece.

Further, when the fourth prism 202 rotates synchronously with the rotation of the third prism 201 while the relative position between the third prism 201 and the fourth prism 202 is changed in the θZ direction, the shape of the hole in the XY-plane can be adjusted. For example, as illustrated in FIG. 11, an elliptical hole Wb can be formed in the workpiece WP. That is, when the relative position between the third prism 201 and the fourth prism 202 is adjusted such that the distance R is changed while the laser light L is turned, the elliptical hole Wb can be formed. In addition, when the distance R is adjusted while the laser light L is turned around the optical axis (center P) of the condensing optical system 80, a hole Wb having a shape different from the elliptical shape can be formed.

Figure 12:
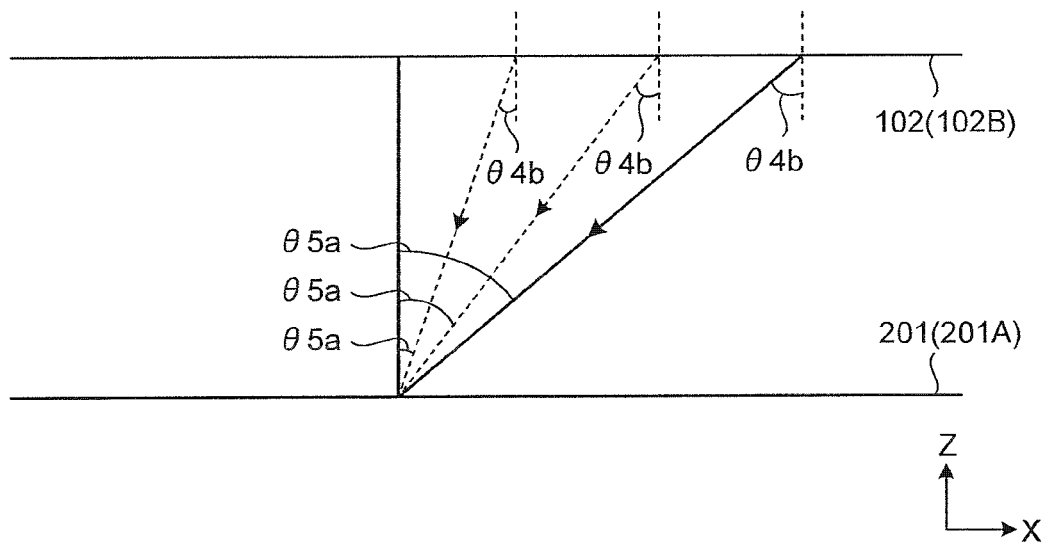
FIG. 12 is an explanatory diagram for describing an example of an irradiation state of laser light.

In the examples with reference to FIGS. 7 and 8, a case where the laser light L was vertically incident on the incidence surface 201A of the third prism 201 was described. In this embodiment, the incidence angle θ5a and the incidence position of the laser light L incident on the incidence surface 201A of the third prism 201 can be changed by the change of the relative position between the first prism 101 and the second prism 102 in the θZ direction. That is, the position and the refraction angle θ4b of the laser light L to be emitted from the emission surface 102B of the second prism 102 are changed depending on the incidence angle θ2a and the refraction angle θ2b at the emission surface 101B, the incidence angle θ3a and the refraction angle θ3b at the incidence surface 102A, the incidence angle θ4a and the refraction angle θ4b at the emission surface 102B, the inclination angle θB of the emission surface 101B, and the inclination angle θC of the incidence surface 102A, in the portions of the respective first prism 101 and the second prism 102 through which the laser light L passes (in the plane through which the laser light L passes). The incidence angle θ2a, the refraction angle θ2b, the incidence angle θ3a, the refraction angle θ3b, the incidence angle θ4a, the refraction angle θ4b, the inclination angle θB, and the inclination angle θC in these portions through which the laser light L passes can be changed by the change of the relative position of the second prism 102 with respect to the first prism 101 in the θZ direction. Accordingly, by the change of the relative position between the first prism 101 and the second prism 102 in the θZ direction, the refraction angle θ4b of the laser light L to be emitted from the emission surface 102B of the second prism 102 and the incidence angle θ5a of the laser light L incident on the incidence surface 201A of the third prism 201 can be adjusted as illustrated in FIG. 12. In this embodiment, when the relative position of the second prism 102 with respect to the first prism 101 is continuously changed in the θZ direction, the incidence angle θ5a of the laser light L incident on the incidence surface 201A of the third prism 201 can be continuously adjusted. Furthermore, the incidence position of the laser light L incident on the incidence surface 201A can be also continuously adjusted.

Figure 13:
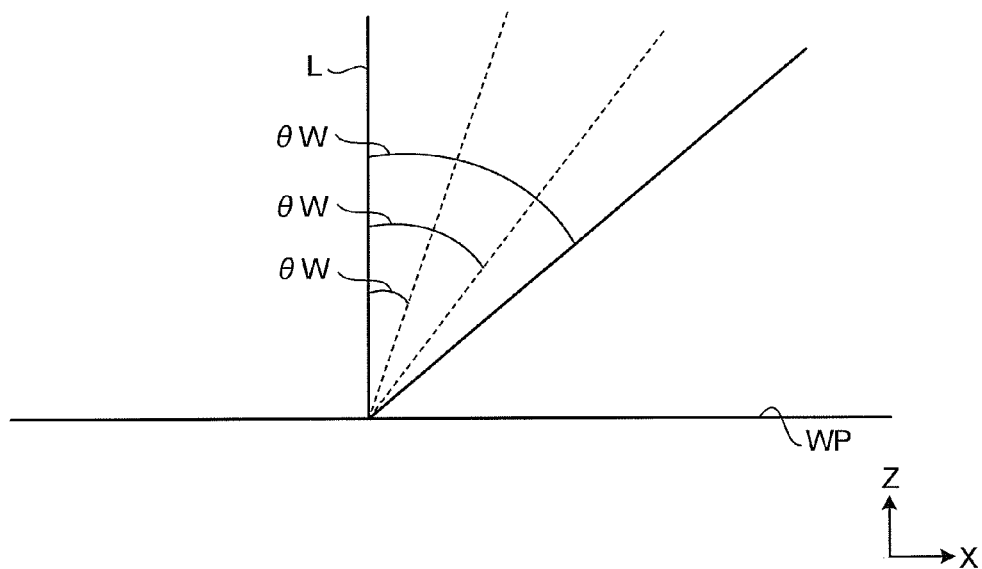
FIG. 13 is an explanatory diagram for describing an example of an irradiation state of laser light.

When the incidence angle θ5a of the laser light L incident on the incidence surface 201A of the third prism 201 is changed, the refraction angle θ8b of the laser light L to be emitted from the emission surface 202B of the fourth prism 202 is changed. Therefore, when the relative position between the first prism 101 and the second prism 102 is changed in the θZ direction, the refraction angle θ8b of the laser light to be emitted from the emission surface 202B of the fourth prism 202 can be adjusted, and an incidence angle θW of the laser light L incident on the front of the workpiece WP can be adjusted as illustrated in FIG. 13. In this embodiment, when the relative position of the second prism 102 with respect to the first prism 101 in the θZ direction is continuously changed, the incidence angle θW of the laser light L incident on the front of the workpiece WP can be continuously adjusted.

Figure 14:
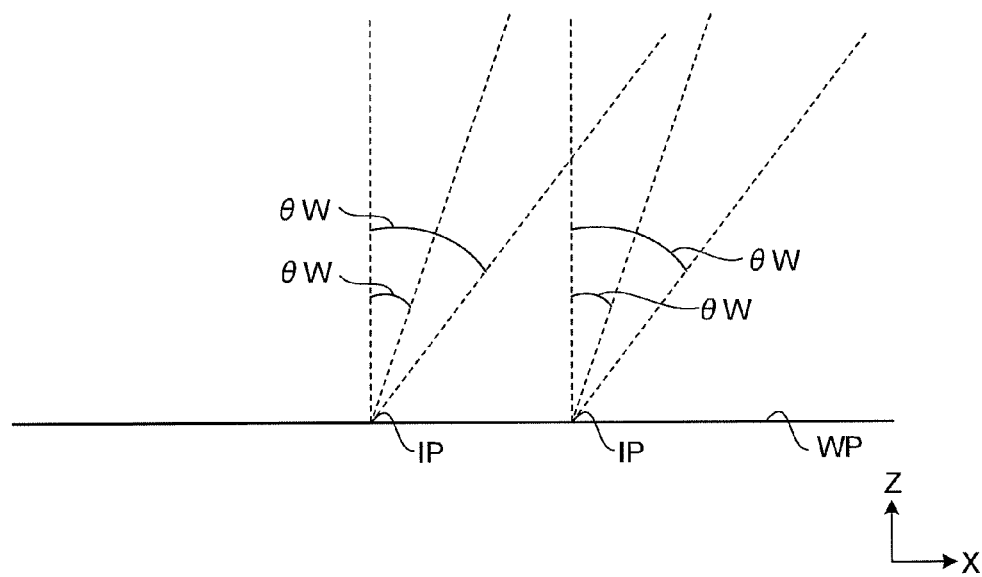
FIG. 14 is an explanatory diagram for describing an example of an irradiation state of laser light.

Then, in this embodiment, when the relative position between the first prism 101 and the second prism 102 and the relative position between the third prism 201 and the fourth prism 202 are changed in the θZ direction, as illustrated in FIG. 14, one or both of the incidence position IP (the distance R separated from the intersection point P) of the laser light L on the front of the workpiece WP and the incidence angle θW of the laser light L with respect to the front of the workpiece WP can be adjusted.

In this way, the controller 24 adjusts the relative position between the first prism 101 and the second prism 102 and the relative position between the third prism 201 and the fourth prism 202 in the θZ direction (rotational direction) and thus can adjust the irradiation conditions of the laser light L including the incidence position (irradiation position) IP and the incidence angle θW of the laser light L with respect to the workpiece WP.

In this embodiment, the first adjustment section 401 of the adjustment device 400 adjusts the incidence angle θW of the laser light L with respect to the front of the workpiece WP, and the second adjustment section 402 adjusts the irradiation position IP of the laser light L. In fact, when the relative position between four prisms 101, 102, 201, and 202 included in the adjustment device 400 is appropriately adjusted in the θZ direction, the incidence position IP of the laser light L on the front of the workpiece WP and the incidence angle θW of the laser light L with respect to the front of the workpiece WP are adjusted. That is, in the above description, the first adjustment section 401 adjusts the incidence angle θW of the laser light L and the second adjustment section 402 adjusts the irradiation position IP of the laser light L, but the first adjustment section 401 can adjust one or both of the incidence angle θW and the irradiation position IP of the laser light L and the second adjustment section 402 can adjust one or both of the incidence angle θW and the irradiation position IP of the laser light L.

Next, an example of a method of processing the workpiece WP using the laser processing apparatus 10 will be described. In the following description, the four prisms 101, 102, 201, and 202 rotate in the same direction. For example, the four prisms 101, 102, 201, and 202 may rotate synchronously with each other in the +θZ direction (clockwise direction), and may rotate synchronously with each other in the −θZ direction (counterclockwise direction).

Figure 15:
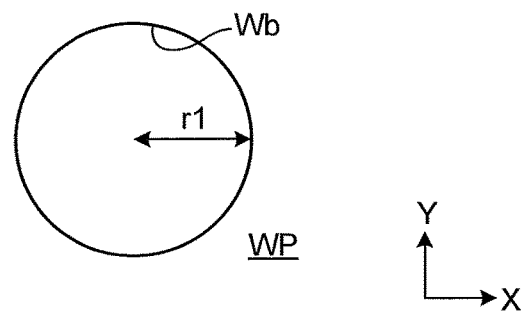
FIG. 15 is a diagram illustrating an example of a hole to be formed in a workpiece.
Figure 15:
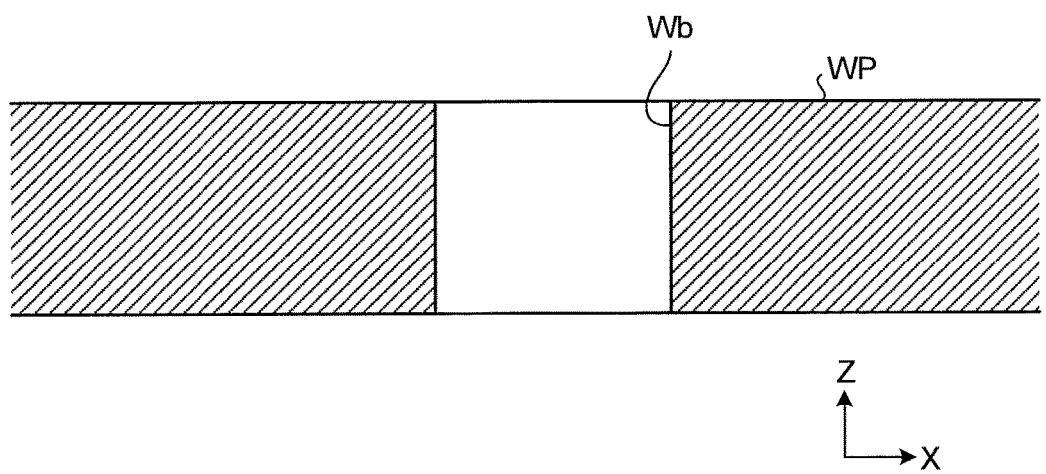

FIG. 15(A) is a plan view of the hole Wb to be processed, and FIG. 15(B) is a cross-sectional view of the hole Wb to be processed. That is, FIG. 15 illustrates a target shape of the hole Wb to be formed in the workpiece WP. As illustrated in FIG. 15(A), the shape of the hole Wb in the XY-plane is circular, and the radius of the hole Wb is r1. As illustrated in FIG. 15(B), the size of the hole Wb is constant from the front to the back of the workpiece WP. That is, the hole Wb is a so-called straight hole.

The controller 24 determines rotation conditions (movement conditions, position conditions) of the four prisms 101, 102, 201, and 202 in the θZ direction based on the storage information of the storage device 26 such that the hole Wb is formed in the workpiece WP as illustrated in FIG. 15. For example, the controller 24 determines the relative position (difference in phase angle) of the four prisms 101, 102, 201, and 202 in the θZ direction based on the storage information of the storage device 26 such that the hole Wb is formed in the workpiece WP as illustrated in FIG. 15. For example, the controller 24 determines the relative position between the first prism 101 and the second prism 102 in the θZ direction such that the straight hole Wb is formed as illustrated in FIG. 15 and determines the relative position between the third prism 201 and the fourth prism 202 in the θZ direction at the same time such that the hole Wb of the radius r1 is formed as illustrated in FIG. 15. As an example, the target angle of the incidence angle θW of the laser light L incident on the front of the workpiece WP may be 0°, and the target position of the incidence position IP of the laser light L incident on the front of the workpiece WP may be a position separated by the distance r1 from the center P. The controller 24 determines the relative positions between the first prism 101, the second prism 102, the third prism 201, and the fourth prism 202 in the θZ direction such that the incidence angle θW and the incidence position IP of the laser light L incident on the front of the workpiece WP are the target angle and the target position, respectively.

In this embodiment, the first driving device 105 and the second driving device 205 are controlled in the processing of the hole Wb such that the relative position between the first prism 101 and the third prism 201 is not changed in the θZ direction. In order that the hole Wb of the target shape is formed, the relative position of the second prism 102 with respect to the first prism 101 is determined, and the relative position of the fourth prism 202 with respect to the third prism 201 is determined in the θZ direction.

Figure 16:
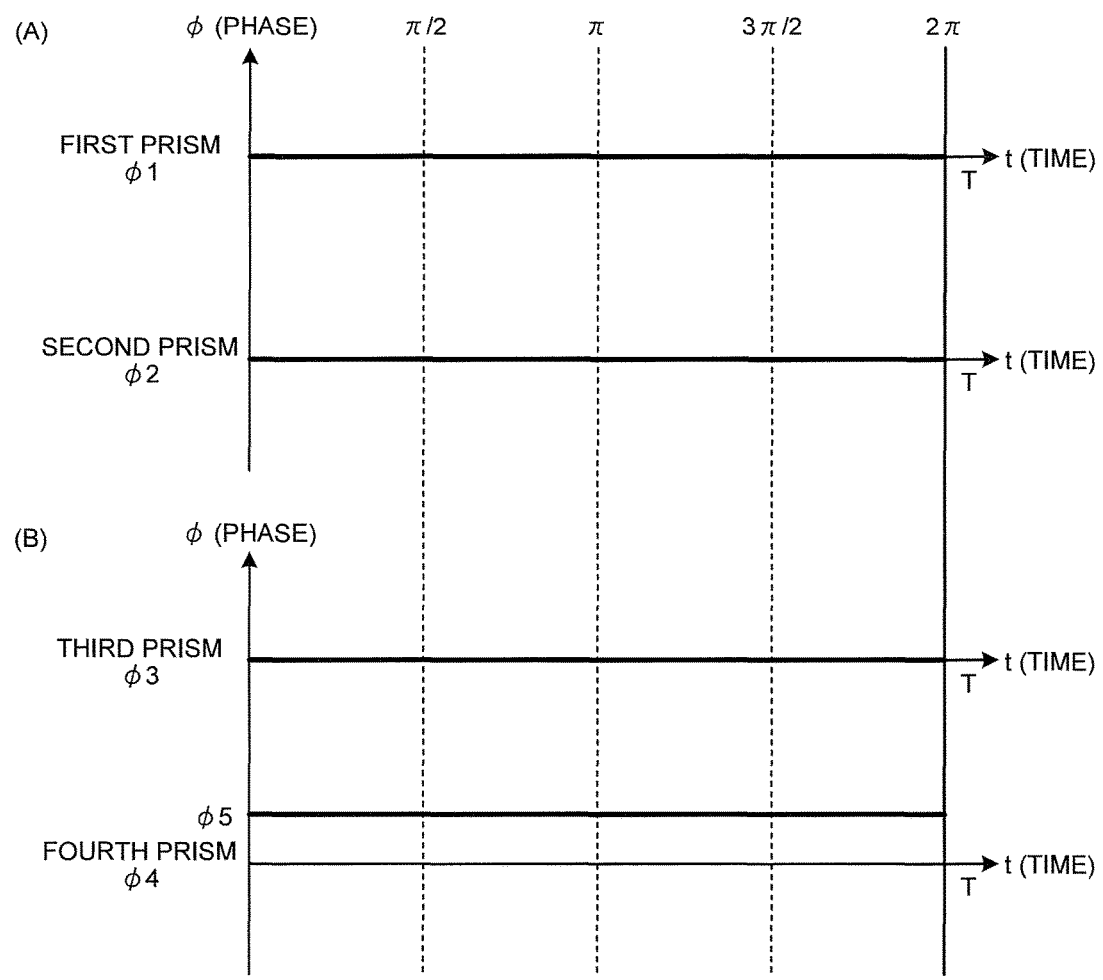
FIG. 16 is an explanatory diagram for describing an operation of four prisms.

FIG. 16 is a diagram illustrating an example of the rotation conditions of the four prisms 101, 102, 201, and 202 in the θZ direction to form the hole Wb as illustrated in FIG. 15. The rotation conditions illustrated in FIG. 16 are stored in the storage device 26. In FIG. 16(A), a horizontal axis represents a rotation time of the first prism 101 and the second prism 102, and a vertical axis represents the relative position (difference in phase angle) of the second prism 102 with respect to the first prism 101 in the θZ direction. In FIG. 16(B), a horizontal axis represents a rotation time of the third prism 201 and the fourth prism 202, and a vertical axis represents the relative position (phase) of the fourth prism 202 with respect to the third prism 201 in the θZ direction. Each of the four prisms 101, 102, 201, and 202 requires a time T until rotating once after starting to rotate from a rotation start position in the θZ direction.

In FIG. 16, the four prisms 101, 102, 201, and 202 have phases (relative phases) $\phi1$, $\phi2$, $\phi3$, and $\phi4$, respectively at each point of time when rotating once at a constant speed over the time T while maintaining a reference relative position. In this embodiment, since the prisms 101 and 201 rotate at a constant speed, the phases (relative phase) between the prism 101 and the prism 201 are constant as $\phi1$ and $\phi3$, respectively, at each point of time when rotating once. In addition, when the prism 101 rotates at a constant speed and the prism 102 rotates at a constant speed without the change of an angular speed, the phase (relative phase with respect to the prism 101) of the prism 102 is constant (see FIGS. 16, 18, 20, and 23). Meanwhile, when the angular speed of the prism 102 is changed in at least a part of one rotation, the phase of the prism 102 is changed. Further, when the prism 201 rotates at a constant speed and the prism 202 rotates at a constant speed without the change of an angular speed, the phase of the prism 202 (relative phase with respect to the prism 201) is constant (see FIGS. 16 and 20). Meanwhile, when the angular speed of the prism 202 is changed in at least a part of one rotation, the phase of the prism 202 is changed (see FIGS. 18 and 23).

In this embodiment, the difference in phase angle of the second prism 102 with respect to the first prism 101 is determined such that the hole Wb is formed as illustrated in FIG. 15. In this embodiment, the difference in phase angle of the second prism 102 with respect to the first prism 101 is ($\phi1-\phi2$) to make the incidence angle θW to be the target angle. The controller 24 determines and adjusts the relative position (difference in phase angle) of the second prism 102 with respect to the first prism 101 in the θZ direction such that the incidence angle θW is the target angle. In addition, the difference in phase angle of the fourth prism 202 with respect to the third prism 201 is determined such that the hole Wb is formed as illustrated in FIG. 15. In this embodiment, the difference in phase angle of the fourth prism 202 with respect to the third prism 201 is ($\phi3-\phi4$) to make the incidence position IP to be the center P, and the difference in phase angle of the fourth prism 202 with respect to the third prism 201 is ($\phi3-\phi5$) to make the incidence position IP to be the target position (position separated by the distance r1 from the center P). The controller 24 determines and adjusts the relative position (difference in phase angle) of the fourth prism 202 with respect to the third prism 201 in the θZ direction such that the incidence position IP is the target position.

The controller 24 rotates the first prism 101 and the third prism 201 together in a state of fixing the relative position (difference in phase angle) between the first prism 101 and the third prism 201 in the θZ direction. In addition, the controller 24 rotates the first prism 101 and the second prism 102 together in a state of fixing the relative position (difference in phase angle) of the second prism 102 with respect to the first prism 101 in the θZ direction, such that the incidence angle θW is the target angle. Further, the controller 24 rotates the third prism 201 and the fourth prism 202 together in a state of fixing the relative position (difference in phase angle) of the fourth prism 202 with respect to the third prism 201 in the θZ direction, such that the incidence position IP is the target position. That is, in this embodiment, the relative positions of the first prism 101, the second prism 102, the third prism 201, and the fourth prism 202 are fixed at the rotation start position, and the first prism 101, the second prism 102, the third prism 201, and the fourth prism 202 rotate together in a state where the relative position is fixed. Thus, the hole Wb is formed as illustrated in FIG. 15.

In this embodiment, further, the first prism 101, the second prism 102, the third prism 201, and the fourth prism 202 rotate at a constant speed. The controller 24 may change the rotation speed in the state of fixing the relative positions of the four prisms 101, 102, 201, and 202.

Figure 17:
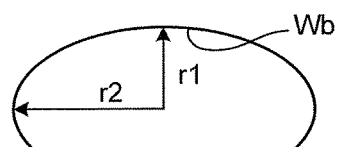
FIG. 17 is a diagram illustrating an example of a hole to be formed in a workpiece.
Figure 17:
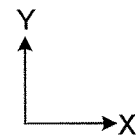
Figure 17:
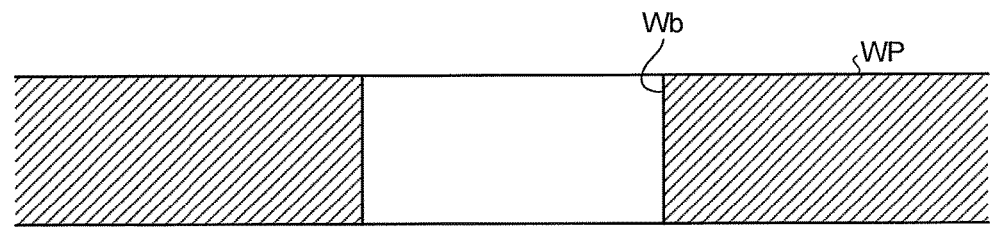
Figure 17:
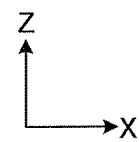

FIG. 17 illustrates another example of a hole Wb to be processed. As illustrated in FIG. 17(A), the shape of the hole Wb in the XY-plane is elliptical, a half dimension of a minor axis of the hole Wb is r1, and a half dimension of a major axis is r2. As illustrated in FIG. 17(B), the size of the hole Wb is constant from the front to the back of the workpiece WP.

The controller 24 determines rotation conditions of the four prisms 101, 102, 201, and 202 in the θZ direction based on the storage information of the storage device 26 such that the hole Wb is formed in the workpiece WP as illustrated in FIG. 17. For example, the controller 24 determines the relative position (difference in phase angle) of the four prisms 101, 102, 201, and 202 in the θZ direction based on the storage information of the storage device 26 such that the hole Wb is formed in the workpiece WP as illustrated in FIG. 17. In this embodiment, the controller 24 determines the relative position between the first prism 101 and the second prism 102 in the θZ direction such that the straight hole Wb is formed and determines the relative position between the third prism 201 and the fourth prism 202 in the θZ direction at the same time such that the elliptical hole Wb is formed. As an example, the target angle of the incidence angle θW of the laser light L incident on the front of the workpiece WP may be 0°, and the target position of the incidence position IP of the laser light L incident on the front of the workpiece WP may be changed between the position separated by the distance r1 from the center P and the position separated by the distance r2 from the center P. The controller 24 adjusts the relative positions between the first prism 101, the second prism 102, the third prism 201, and the fourth prism 202 in the θZ direction such that the incidence angle θW and the incidence position IP of the laser light L incident on the front of the workpiece WP are the target angle and the target position, respectively.

The first driving device 105 and the second driving device 205 are controlled in the processing of the hole Wb such that the relative position between the first prism 101 and the third prism 201 is not changed in the θZ direction. In order that the hole Wb of the target shape is formed, the relative position of the second prism 102 with respect to the first prism 101 is determined and the relative position of the fourth prism 202 with respect to the third prism 201 is determined in the θZ direction.

Figure 18:
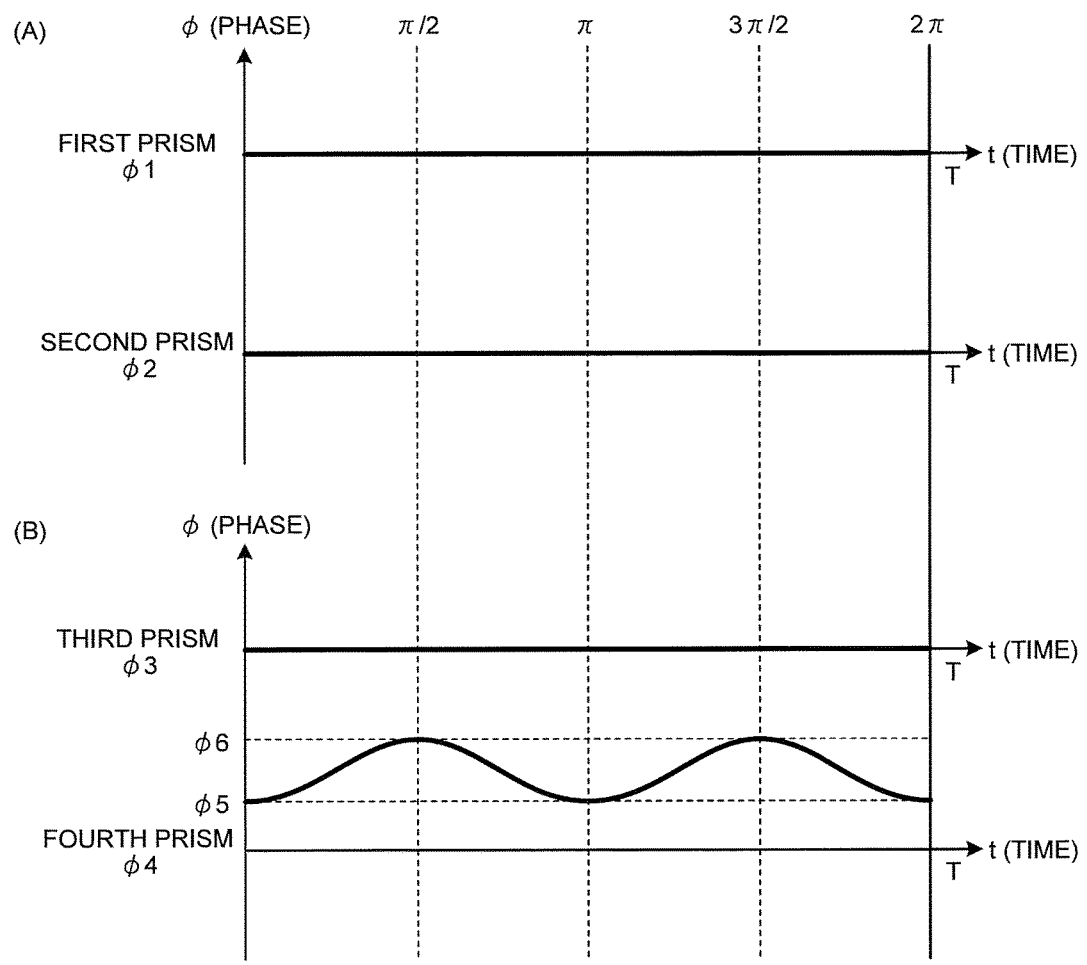
FIG. 18 is an explanatory diagram for describing an operation of four prisms.

FIG. 18 is a diagram illustrating an example of the rotation conditions of the four prisms 101, 102, 201, and 202 in the θZ direction to form the hole Wb as illustrated in FIG. 17. The difference in phase angle of the second prism 102 with respect to the first prism 101 is determined such that the hole Wb is formed as illustrated in FIG. 17. The difference in phase angle of the second prism 102 with respect to the first prism 101 is ($\phi1-\phi2$) to make the incidence angle θW to be the target angle. The controller 24 determines and adjusts the relative position (difference in phase angle) of the second prism 102 with respect to the first prism 101 in the θZ direction such that the incidence angle θW is the target angle. In addition, the difference in phase angle of the fourth prism 202 with respect to the third prism 201 is determined such that the hole Wb is formed as illustrated in FIG. 17. In this embodiment, the difference in phase angle of the fourth prism 202 with respect to the third prism 201 is ($\phi3-\phi5$) to make the incidence position IP to be a position separated by the distance r1 from the center P, and the difference in phase angle of the fourth prism 202 with respect to the third prism 201 is ($\phi3-\phi6$) to make the incidence position IP to be a position separated by the distance r2 from the center P. The controller 24 determines and adjusts the relative position (difference in phase angle) of the fourth prism 202 with respect to the third prism 201 in the θZ direction such that the incidence position IP is the target position.

The controller 24 rotates the first prism 101 and the third prism 201 together in a state of fixing the relative position (difference in phase angle) between the first prism 101 and the third prism 201 in the θZ direction. In addition, the controller 24 rotates the first prism 101 and the second prism 102 together in a state of fixing the relative position (difference in phase angle) of the second prism 102 with respect to the first prism 101 in the θZ direction, such that the incidence angle θW is the target angle. Further, the controller 24 rotates the fourth prism 202 while changing the relative position (difference in phase angle) with the third prism 201 in one rotation of the third prism 201 in the θZ direction. In this embodiment, the controller 24 rotates the fourth prism 202 synchronously with the rotation of the third prism 201 while changing the difference in phase angle of the fourth prism 202 with respect to the third prism 201 such that the difference in phase angle between the third prism 201 and the fourth prism 202 is changed between ($\phi3-\phi5$) and ($\phi3-\phi6$). In this way, the hole Wb is formed as illustrated in FIG. 17. In one rotation of the third prism 201, the controller 24 may rotate the fourth prism 202 at a first angle (for example, 90°) by fixing the relative position of the third prism 201, and may rotate the fourth prism 202 at a second angle (for example, 90°) while changing the relative position with respect to the third prism 201.

In this embodiment, the first prism 101, the second prism 102, and the third prism 201 rotate at a constant speed, and the rotation speed (angular speed) of the fourth prism 202 is changed. The controller 24 may change the rotation speed in the state of fixing the relative positions of the three prisms 101, 102, and 201.

Figure 19:
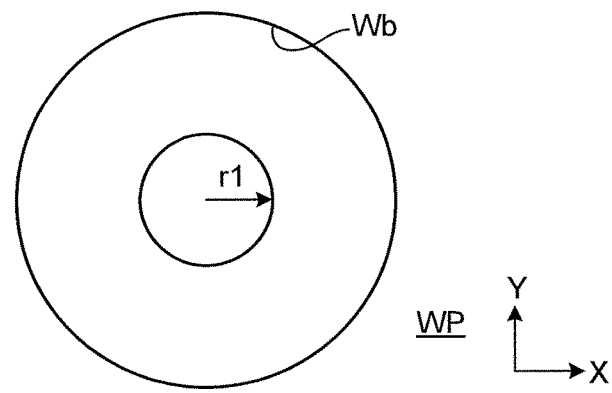
FIG. 19 is a diagram illustrating an example of a hole to be formed in a workpiece.
Figure 19:
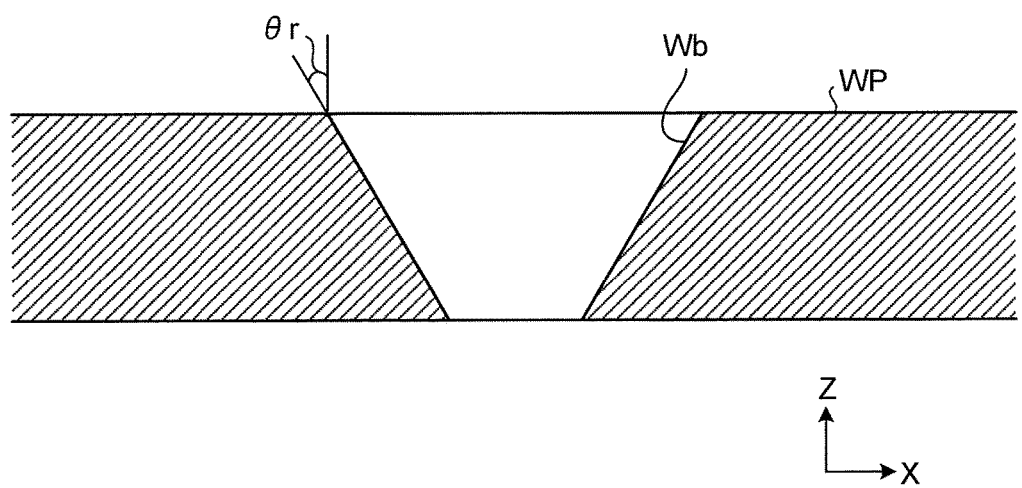

FIG. 19 illustrates another example of a hole Wb to be processed. As illustrated in FIG. 19(A), the shape of the hole Wb in the XY-plane is circular. As illustrated in FIG. 19(B), the size of the hole Wb becomes gradually smaller from the front to the back of the workpiece WP. That is, the hole Wb is a so-called tapered hole.

The controller 24 determines relative positions (differences in phase angle) of the four prisms 101, 102, 201, and 202 in the θZ direction based on the storage information of the storage device 26 such that the hole Wb is formed in the workpiece WP as illustrated in FIG. 19. As an example, the target angle of the incidence angle θW of the laser light L incident on the front of the workpiece WP may be a θr degree, and the target position of the incidence position IP of the laser light L incident on the front of the workpiece WP may be a position separated by a distance r1 from the center P. The controller 24 adjusts the relative positions between the first prism 101, the second prism 102, the third prism 201, and the fourth prism 202 in the θZ direction such that the incidence angle θW and the incidence position IP of the laser light L incident on the front of the workpiece WP are the target angle and the target position, respectively.

The first driving device 105 and the second driving device 205 are controlled in the processing of the hole Wb such that the relative position between the first prism 101 and the third prism 201 is not changed in the θZ direction. In order that the hole Wb of the target shape is formed, the relative position of the second prism 102 with respect to the first prism 101 is determined and the relative position of the fourth prism 202 with respect to the third prism 201 is determined in the θZ direction.

Figure 20:
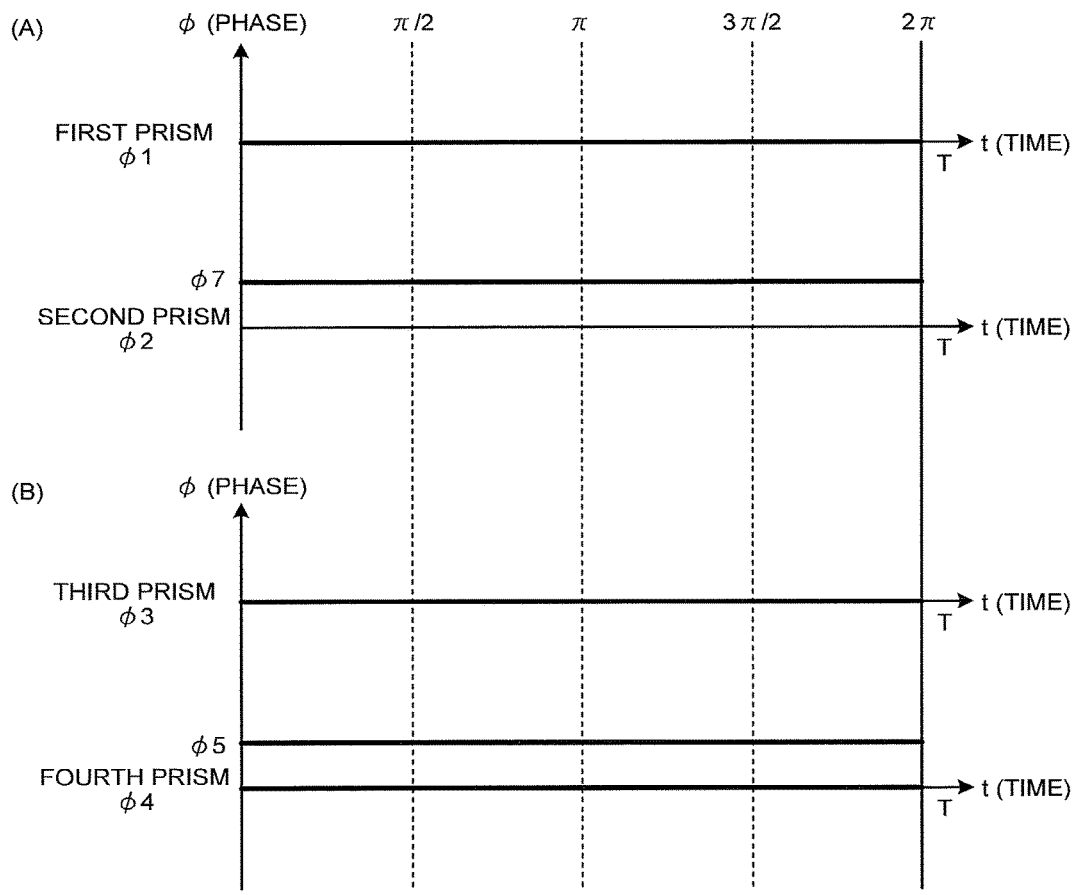
FIG. 20 is an explanatory diagram for describing an operation of four prisms.

FIG. 20 is a diagram illustrating an example of the rotation conditions of the four prisms 101, 102, 201, and 202 in the θZ direction to form the hole Wb as illustrated in FIG. 19. The difference in phase angle of the second prism 102 with respect to the first prism 101 is determined such that the tapered hole Wb is formed as illustrated in FIG. 19. In this embodiment, the difference in phase angle of the second prism 102 with respect to the first prism 101 is ($\phi1-\phi7$) to make the incidence angle θW to be the target angle. The controller 24 determines and adjusts the relative position (difference in phase angle) of the second prism 102 with respect to the first prism 101 in the θZ direction such that the incidence angle θW is the target angle. In addition, the difference in phase angle of the fourth prism 202 with respect to the third prism 201 is determined such that the circular hole Wb is formed as illustrated in FIG. 19. In this embodiment, the difference in phase angle of the fourth prism 202 with respect to the third prism 201 is ($\phi3-\phi5$) to make the incidence position IP to be the target position. The controller 24 determines and adjusts the relative position (difference in phase angle) of the fourth prism 202 with respect to the third prism 201 in the θZ direction such that the incidence position IP is the target position.

The controller 24 rotates the first prism 101 and the third prism 201 together in a state of fixing the relative position (difference in phase angle) between the first prism 101 and the third prism 201 in the θZ direction. In addition, the controller 24 rotates the first prism 101 and the second prism 102 together in a state of fixing the relative position (difference in phase angle) of the second prism 102 with respect to the first prism 101 in the θZ direction, such that the incidence angle θW is the target angle. Further, the controller 24 rotates the third prism 201 and the fourth prism 202 together in a state of fixing the relative position (difference in phase angle) of the fourth prism 202 with respect to the third prism 201 in the θZ direction, such that the incidence position IP is the target position. In this way, the hole Wb is formed as illustrated in FIG. 19.

Figure 21:
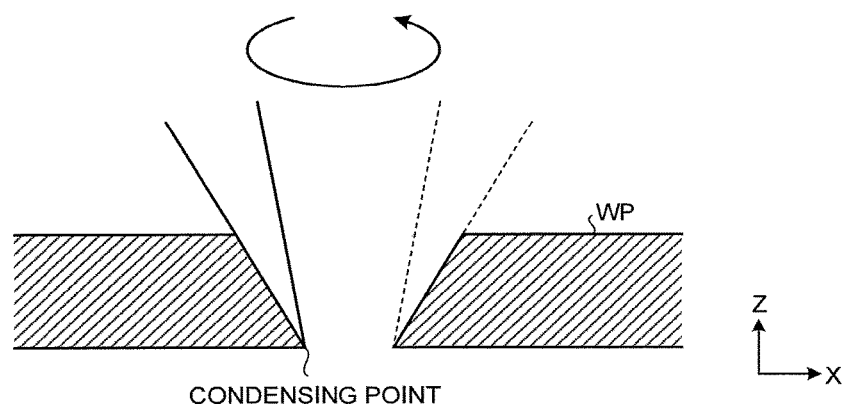
FIG. 21 is a diagram illustrating an example of a position relation between a condensing point and a workpiece.

In this embodiment, as illustrated in FIG. 21, a relative position between the condensing optical system 80 (laser processing head 60) and the workpiece WP is adjusted in the Z-axis direction parallel to the optical axis AX such that a condensing position (condensing point) of the condensing optical system 80 coincides with the back of the workpiece WP. In this embodiment, the relative position between the condensing optical system 80 and the workpiece WP in the Z-axis direction is adjusted by the movable unit 14 including the Z-axis moving mechanism 38. The controller 24 controls the movable unit 14 to perform the irradiation of the laser light L in the state where the condensing position of the condensing optical system 80 coincides with the back of the workpiece WP. Thus, the hole Wb is formed as illustrated in FIG. 19.

Figure 22:
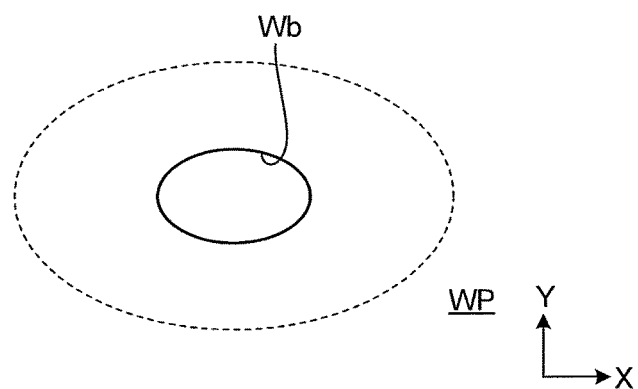
FIG. 22 is a diagram illustrating an example of a hole to be formed in a workpiece.
Figure 22:
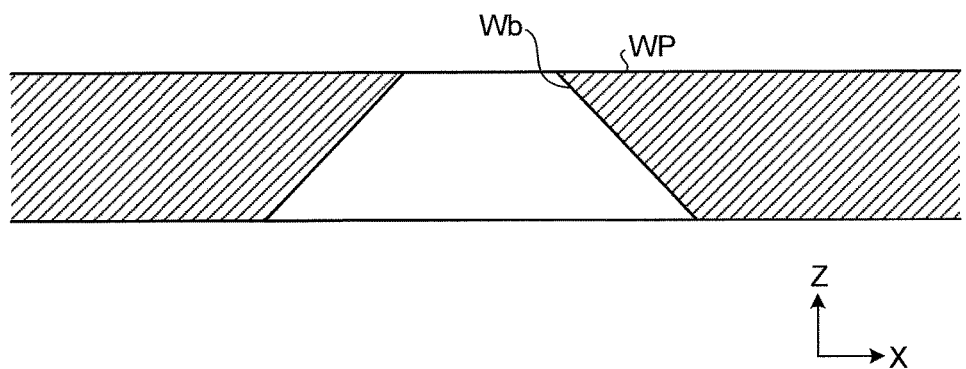

FIG. 22 illustrates another example of a hole Wb to be processed. As illustrated in FIG. 22(A), the shape of the hole Wb in the XY-plane is elliptical. As illustrated in FIG. 22(B), the size of the hole Wb becomes gradually lager from the front to the back of the workpiece WP. That is, the hole Wb is a so-called reverse tapered hole.

The controller 24 determines relative positions (differences in phase angle) of the four prisms 101, 102, 201, and 202 in the θZ direction based on the storage information of the storage device 26 such that the hole Wb is formed in the workpiece WP as illustrated in FIG. 22. The controller 24 determines the relative position between the first prism 101 and the second prism 102 in the θZ direction such that the reverse tapered hole Wb is formed and determines the relative position between the third prism 201 and the fourth prism 202 in the θZ direction at the same time such that the hole Wb is formed to have the size as illustrated in FIG. 22. The controller 24 adjusts the relative positions between the first prism 101, the second prism 102, the third prism 201, and the fourth prism 202 in the θZ direction such that the incidence angle θW and the incidence position IP of the laser light L incident on the front of the workpiece WP are the target angle and the target position, respectively.

The first driving device 105 and the second driving device 205 are controlled in the processing of the hole Wb such that the relative position between the first prism 101 and the third prism 201 is not changed in the θZ direction. In order that the hole Wb of the target shape is formed, the relative position of the second prism 102 with respect to the first prism 101 in the θZ direction is determined and the relative position of the fourth prism 202 with respect to the third prism 201 in the θZ direction is determined.

Figure 23:
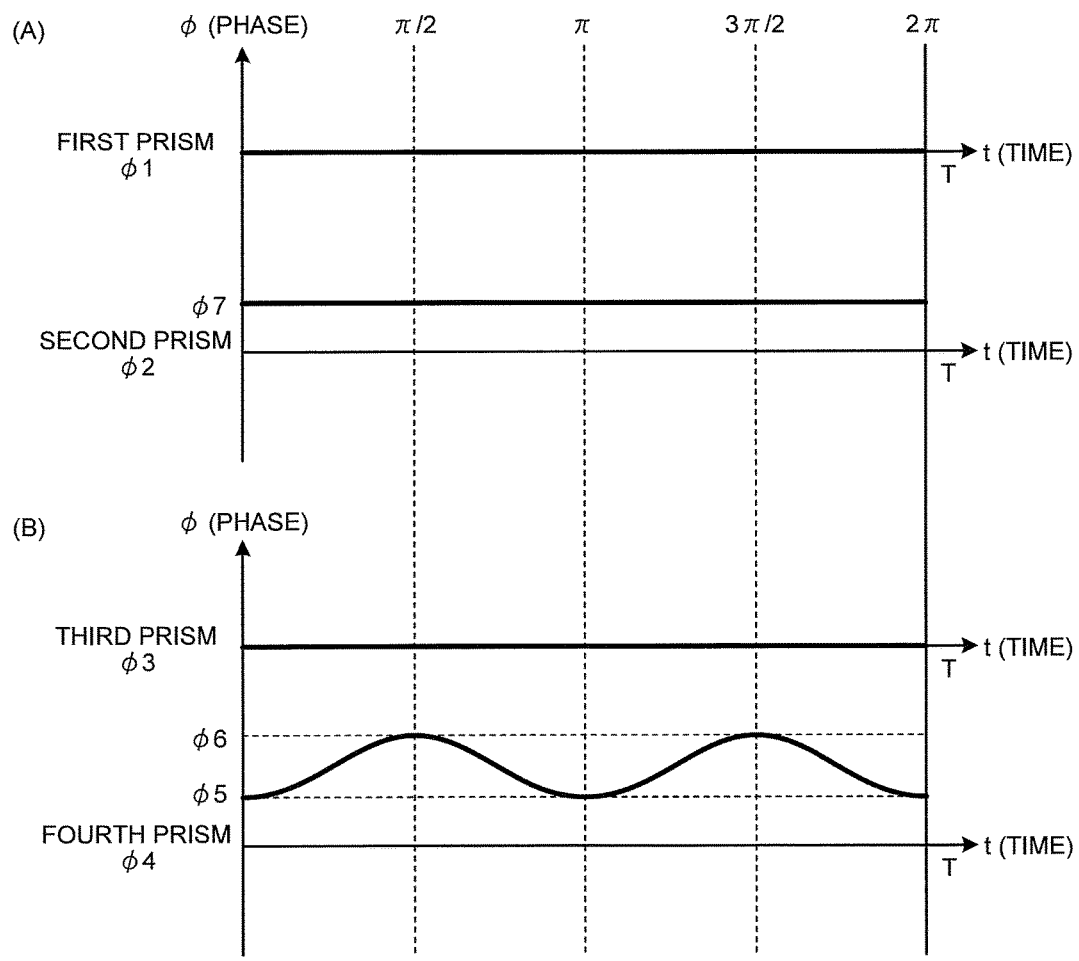
FIG. 23 is an explanatory diagram for describing an operation of four prisms.

FIG. 23 is a diagram illustrating an example of the rotation conditions of the four prisms 101, 102, 201, and 202 in the θZ direction to form the hole Wb as illustrated in FIG. 22. The difference in phase angle of the second prism 102 with respect to the first prism 101 is determined such that the hole Wb is formed to have a tapered angle as illustrated in FIG. 22. In addition, the difference in phase angle of the fourth prism 202 with respect to the third prism 201 is determined such that the elliptical hole Wb is formed as illustrated in FIG. 22.

The controller 24 rotates the first prism 101 and the third prism 201 together in a state of fixing the relative position (difference in phase angle) between the first prism 101 and the third prism 201 in the θZ direction. In addition, the controller 24 rotates the first prism 101 and the second prism 102 together in a state of fixing the relative position (difference in phase angle) of the second prism 102 with respect to the first prism 101 in the θZ direction, such that the incidence angle θW is the target angle. Further, the controller 24 rotates the fourth prism 202 while changing the relative position (difference in phase angle) with the third prism 201 in one rotation of the third prism 201 in the θZ direction. In this embodiment, the controller 24 rotates the fourth prism 202 synchronously with the rotation of the third prism 201 while changing the difference in phase angle of the fourth prism 202 with respect to the third prism 201 such that the difference in phase angle between the third prism 201 and the fourth prism 202 is changed between ($\phi 3-\phi 5$) and ($\phi 3-\phi 6$). In this way, the hole Wb is formed as illustrated in FIG. 22.

Figure 24:
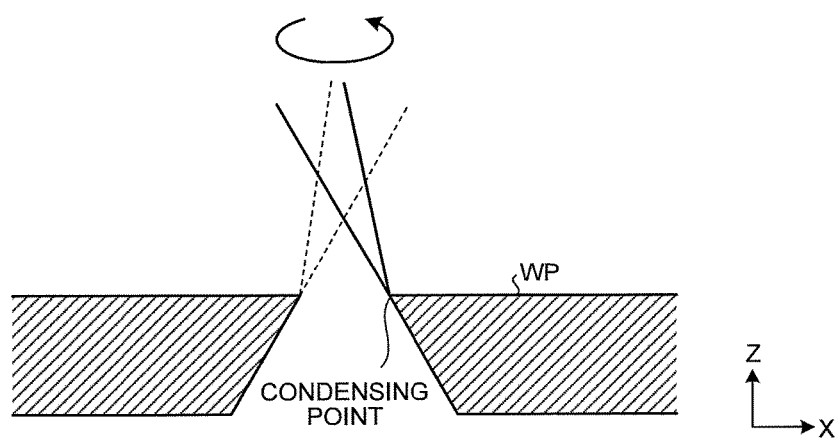
FIG. 24 is a diagram illustrating an example of a position relation between a condensing point and a workpiece.

In this embodiment, as illustrated in FIG. 24, the relative position between the condensing optical system 80 (laser processing head 60) and the workpiece WP is adjusted by the movable unit 14 in the Z-axis direction parallel to the optical axis AX such that the condensing position (condensing point) of the condensing optical system 80 coincides with the front of the workpiece WP. The controller 24 controls the movable unit 14 to perform the irradiation of the laser light L in the state where the condensing position of the condensing optical system 80 coincides with the front of the workpiece WP. Thus, the hole Wb is formed as illustrated in FIG. 22.

As described above, according to this embodiment, the incidence angle θW and the incidence position IP of the laser light L can be adjusted with respect to the workpiece WP by the adjustment device 400 that is provided with the first adjustment section 401 including the first prism 101, the second prism 102, and the first driving device 105 and the second adjustment section 402 including the third prism 201, the fourth prism 202, and the second driving device 205, and thus the hole Wb of an arbitrary shape can be formed in the workpiece WP with high accuracy. Accordingly, the workpiece WP can be processed with high quality and high accuracy.

Furthermore, since this embodiment is configured to rotate the first prism 101 and the third prism 201 together in the state where the relative position between the first prism 101 and the third prism 201 in the θZ direction is fixed and to adjust the relative position of the second prism 102 with respect to the first prism 101 in the θZ direction and the relative position of the fourth prism 202 with respect to the third prism 201 to adjust the irradiation conditions (one or both of the incidence angle θW and the incidence position IP) of the laser light L, complication of control can be suppressed. Further, the rotation of the second prism 102 and the fourth prism 202 is controlled such that the desired incidence angle θW and incidence position IP can be obtained while the first prism 101 and the third prism 201 rotate at a constant speed in the state where the relative position between the first prism 101 and the third prism 201 is fixed, and thus complication of control can be further suppressed.

Further, since this embodiment is configured to determine the relative position of the second prism 102 with respect to the first prism 101 in the θZ direction such that the incidence angle θW is the target angle and to rotate the first prism 101 and the second prism 102 together in the state where the determined relative position is fixed, the straight hole, the tapered hole, and the reverse tapered hole can be formed with high quality.

Further, this embodiment is configured to rotate the fourth prism 202 while changing the relative position with respect to the third prism 201 in one rotation of the third prism 201, and thus a hole of an arbitrary shape can be formed in the XY-plane. In the above embodiment, the case of forming the elliptical hole is described as an example, but a hole of an arbitrary shape, for example, a heart-like hole can be formed.

In addition, the irradiation of the laser light L is performed by adjustment of the relative position between the condensing position of the condensing optical system 80 and the workpiece WP in the Z-axis direction, and thus the tapered hole can be formed as illustrated in FIGS. 19 and 21, and the reverse tapered hole can be formed as illustrated in FIGS. 22 and 24.

In this embodiment, the second prism 102 may be rotated while the relative position with respect to the first prism 101 is changed in one rotation of the first prism 101. In this way, a hole can be formed to have an inner side of a different inclination angle.

Figure 25:
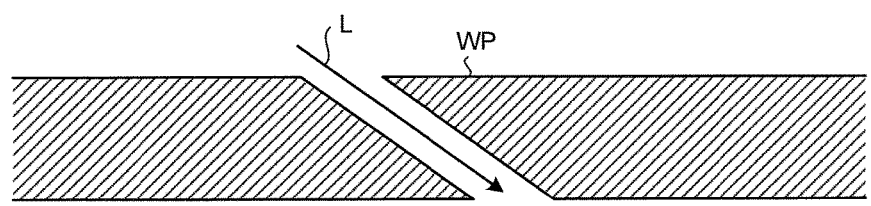
FIG. 25 is a schematic diagram illustrating an example of a processed workpiece.

In the above embodiment, an example of processing the hole by rotating the four prisms 101, 102, 201, and 202 and turning the laser light L around the optical axis AX was described. Irradiation of the laser light L may be executed without the rotation of the four prisms 101, 102, 201, and 202 in a state where the relative positions of the four prisms 101, 102, 201, and 202 are fixed such that the irradiation conditions of the laser light L correspond to a desired incidence angle θW and incidence position IP. Thus, for example, as illustrated in FIG. 25, the workpiece WP can be cut by the laser light. In addition, an angle of a cutting surface of the workpiece WP can be adjusted by adjustment of the incidence angle θW of the laser light L. The same also applies to the following embodiment.

In the above embodiment, the optical axis of the condensing optical system 80 may be parallel to the Z-axis, and the optical axis of the collimating optical system 70 may be parallel to the X-axis (or Y-axis). Each of the optical axis of the condensing optical system 80 and the optical axis of the collimating optical system 70 may be parallel to the Z-axis, and these optical axes may be misaligned (may not be coaxial). In this case, after the traveling direction of the laser light L emitted from the collimating optical system 70 is changed by the optical element such as a mirror, the laser light L may be supplied to the optical system of the adjustment device 400. The same also applies to the following embodiment.

Second Embodiment

A second embodiment will be described. In the description below, constituents identical or equivalent to those of the above embodiment will be denoted by the same reference numerals, and descriptions thereof will be abbreviated or not be presented.

Figure 26:
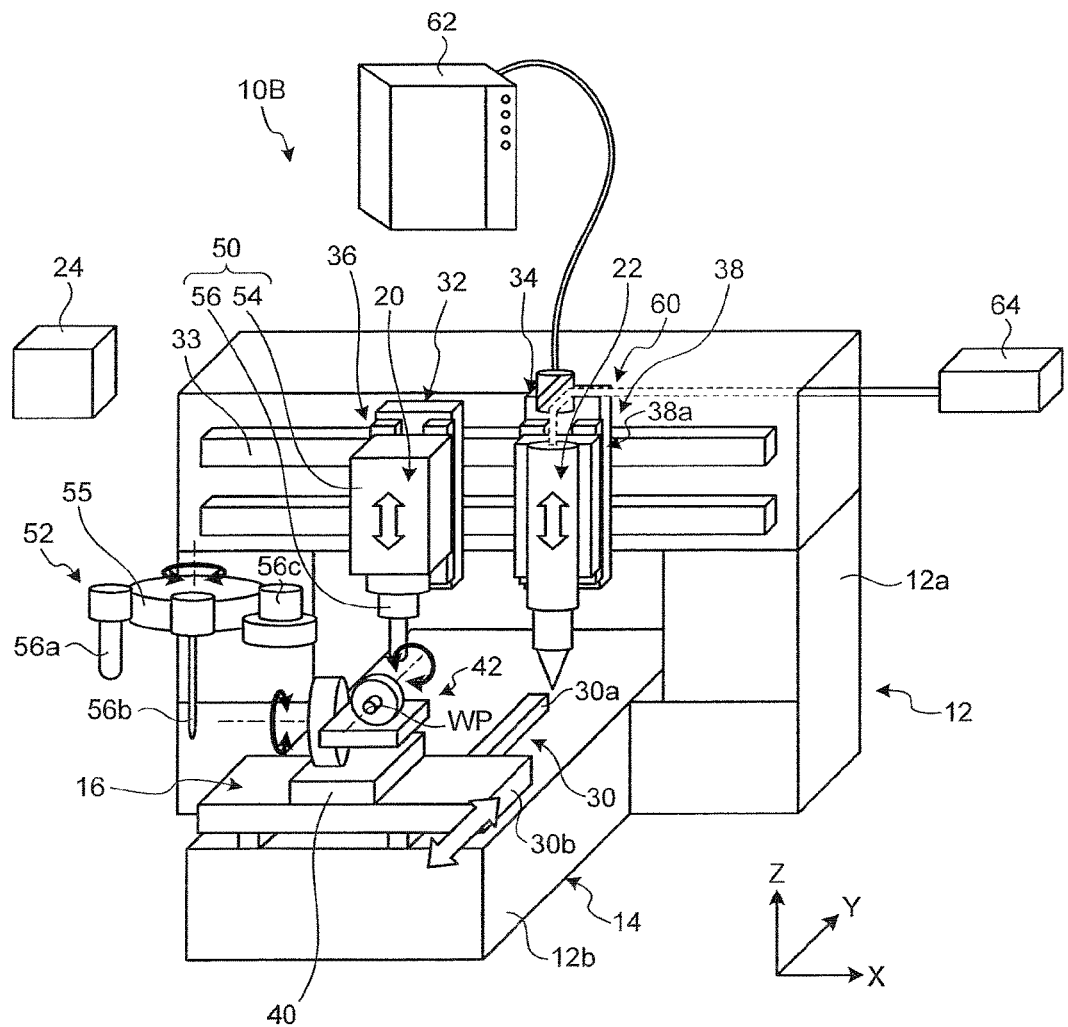
FIG. 26 is a schematic diagram illustrating a schematic configuration of a multifunctional processing apparatus according to the present embodiment.
Figure 27:
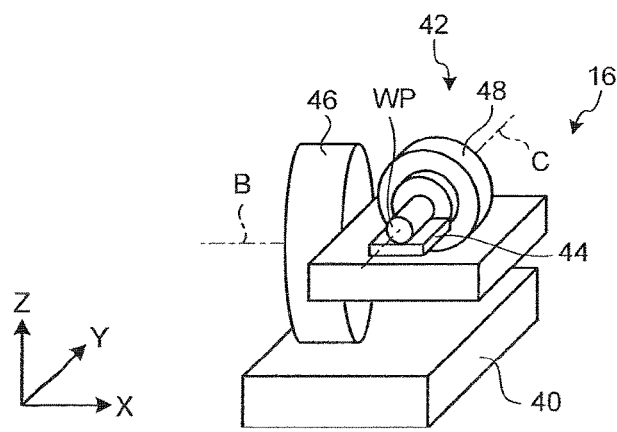
FIG. 27 is a perspective view illustrating a schematic configuration of a stage unit.

FIG. 26 is a schematic diagram illustrating a schematic configuration of a multifunctional processing apparatus 10B according to this embodiment. FIG. 27 is a perspective view illustrating a schematic configuration of a stage unit.

The multifunctional processing apparatus 10B includes a frame 12, a movable unit 14, a stage unit 16, a machining unit 20 having a machining head 50, a laser processing unit 22 having a laser processing head 60, and a controller 24. The multifunctional processing apparatus 10B performs a machining work on a workpiece WP held in the stage unit 16 using the machining unit 20. In addition, the multifunctional processing apparatus 10B irradiates the workpiece WP held in the stage unit 16 with the laser light L using the laser processing unit 22, and processes the workpiece WP with a laser.

The movable unit 14 moves the workpiece WP and the machining head 50 relative to each other and moves the workpiece WP and the laser processing head 60 relative to each other. The movable unit 14 has a Y-axis moving mechanism 30, a first X-axis moving mechanism 32, a second X-axis moving mechanism 34, a first Z-axis moving mechanism 36, and a second Z-axis moving mechanism 38.

The movable unit 14 moves the workpiece WP and the machining head 50 relative to each other in the X-axis direction, the Y-axis direction, and the Z-axis direction, respectively, using the Y-axis moving mechanism 30, the first X-axis moving mechanism 32, and the first Z-axis moving mechanism 36, and moves the workpiece WP and the laser processing head 60 relative to each other in the X-axis direction, the Y-axis direction, and the Z-axis direction, respectively, using the Y-axis moving mechanism 30, the second X-axis moving mechanism 34, and the second Z-axis moving mechanism 38.

The stage unit 16 is arranged on a Y-axis moving member 30b of the Y-axis moving mechanism 30. The stage unit 16 includes a support base 40, a stage moving mechanism 42, and a stage 44. The support base 40 is a plate-like member that is fixed to the Y-axis moving member 30b and supports the stage moving mechanism 42. The stage moving mechanism 42 is fixed onto the support base 40 and moves the stage 44 with respect to the support base 40. The stage moving mechanism 42 includes a B-axis rotating mechanism 46 and a C-axis rotating mechanism 48 as illustrated in FIG. 27. The B-axis rotating mechanism 46 is fixed to the support base 40 and rotates the C-axis rotating mechanism 48 around a B-axis with respect to the support base 40. Here, the B-axis is an axis that coincides with the X-axis. The C-axis rotating mechanism 48 is fixed to the B-axis rotating mechanism 46 and rotates the stage 44 around a C-axis with respect to the B-axis rotating mechanism 46. Here, the C-axis is an axial direction orthogonal to the B-axis, that is, the X-axis. The stage moving mechanism 42 can rotate the stage 44 around each of two axes orthogonal to each other with respect to the support base 40. In addition, the stage 44 is a mechanism that supports the workpiece WP. The stage 44 of this embodiment is a plate-like member to which the workpiece WP is fixed. In addition, the stage 44 is provided with a roller coming in contact with the workpiece WP fixed to the plate-like member, and the roller suppresses the rotation of the workpiece WP. The stage unit 16 is set to the Y-axis moving mechanism 30 to fix the workpiece WP onto the stage 44. Furthermore, the stage unit 16 adjusts the direction, that is, posture of the workpiece WP by the rotation of the stage 44 using the stage moving mechanism 42.

The machining unit 20 includes the machining head 50 and a tool exchange unit 52. The machining head 50 is a mechanism that performs machining of the workpiece WP, and includes a head body 54 and a tool 56 detachably mounted onto the head body 54. The machining head 50 rotates or vibrates the tool 56 using the head body 54 in a state where the tool 56 is brought into contact with the workpiece WP, thereby processing the workpiece WP. A measurement tool is mounted onto the head body 54, and thus the machining head 50 can also perform measurement of the workpiece WP. The tool exchange unit 52 includes a support 55 having a plurality of support mechanisms for supporting the tools, and the support 55 supports a plurality of tools 56a, 56b, and 56c. The tool 56a is an elongated rod-like member, and is a tool in which a grinding wheel surface is provided on a portion of a tip. The tool 56b is an elongated rod-like member, and is a tool in which a grinding wheel surface is provided on a side. The tool 56c is a measurement tool, and is provided with an air passage for supplying air. For example, the machining unit 20 supplies air from the air passage in a state where a measurement object (workpiece) is sealed and measures the change in internal pressure caused by the air to be discharged from an opening of the measurement object, thereby measuring a volume of an internal space or a diameter of an opening or measures whether the opening is open. The tool exchange unit 52 is arranged within the movable range of the machining head 50. The tool exchange unit 52 is configured to remove the mounted tool 56 from the head body 54 by making the support mechanism to hold the mounted tool on the machining head 50 in a space without the tool in the support, and to attach other tool held in the support mechanism to the head body 54. The machining unit 20 can perform the intended processing by switching of the tool to be mounted onto the head body 54 in response to the processing of the workpiece WP. In addition, the number of tools is not particularly limited.

Figure 28:
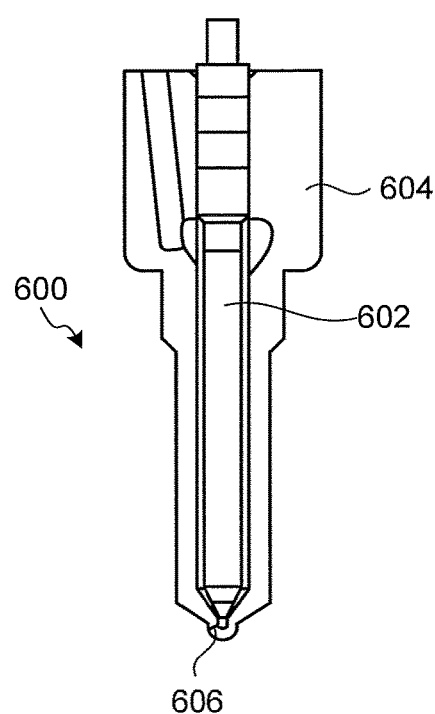
FIG. 28 is a schematic diagram illustrating a schematic configuration of an injector.
Figure 29:
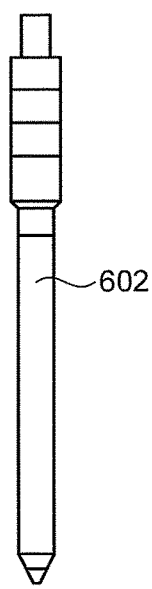
FIG. 29 is a schematic diagram illustrating a schematic configuration of a needle.
Figure 30:
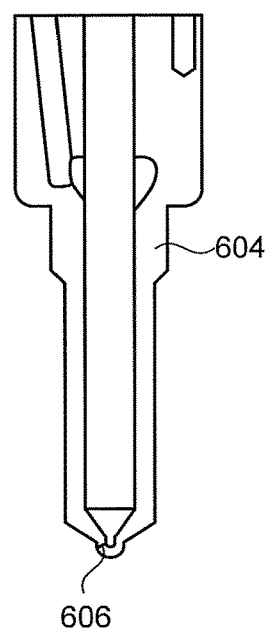
FIG. 30 is a schematic diagram illustrating a schematic configuration of a nozzle body.
Figure 31:
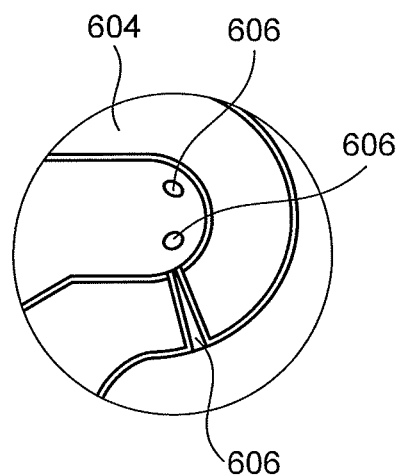
FIG. 31 is an enlarged view of the nozzle body.
Figure 32:
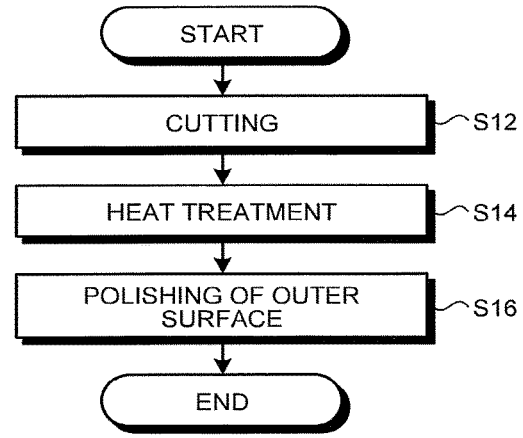
FIG. 32 is a flowchart illustrating an example of a manufacturing method for the needle.
Figure 33:
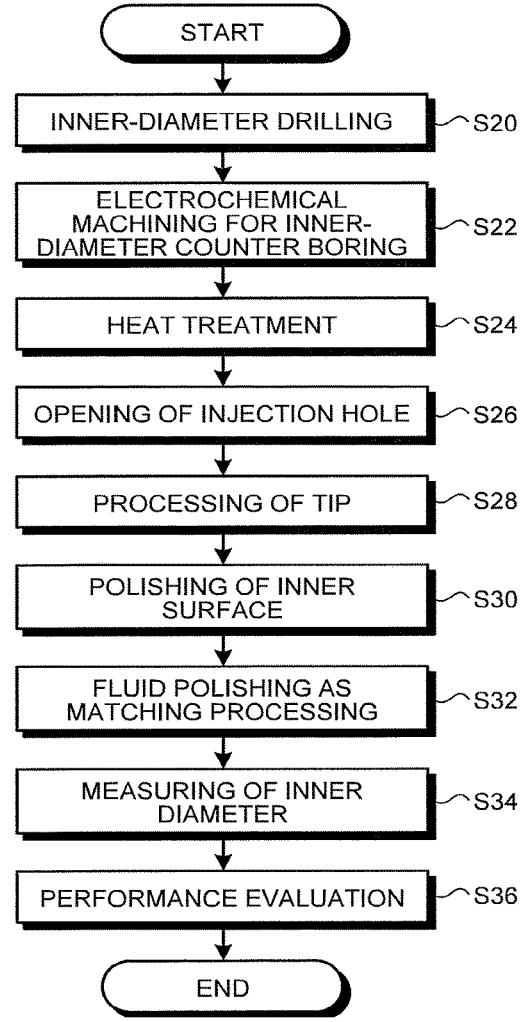
FIG. 33 is a flowchart illustrating an example of a manufacturing method for the nozzle body.
Figure 38:
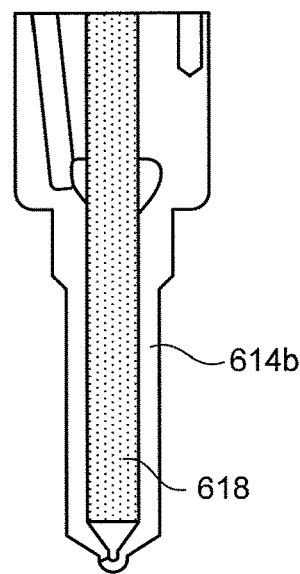
FIG. 38 is an explanatory diagram for describing an operation of the multifunctional processing apparatus.
Figure 39:
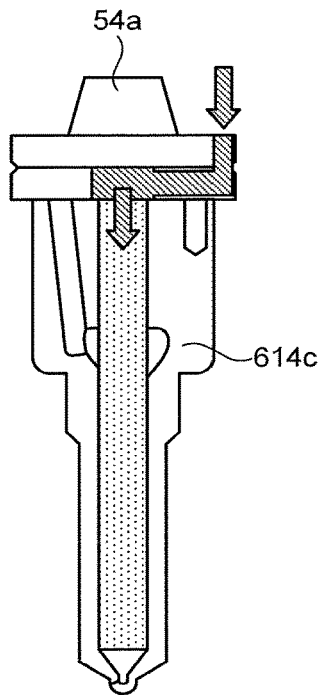
FIG. 39 is an explanatory diagram for describing an operation of the multifunctional processing apparatus.
Figure 40:
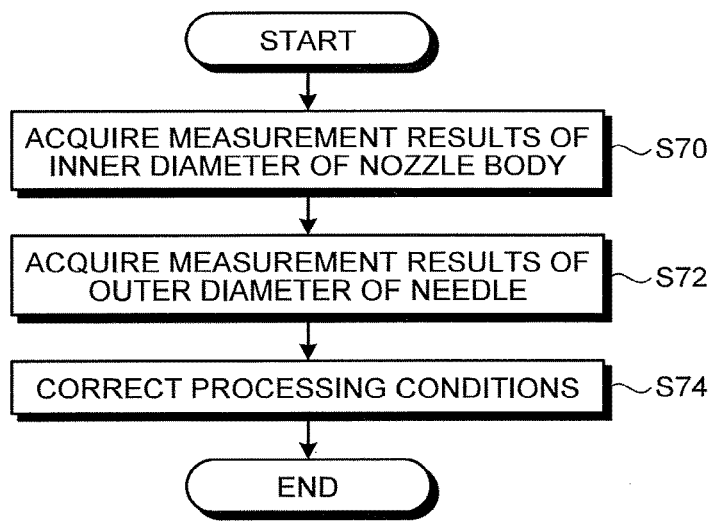
FIG. 40 is a flowchart for describing an operation of the multifunctional processing apparatus.

Next, an operation of the multifunctional processing apparatus 10B, that is, an example of a multifunctional processing method will be described with reference to FIGS. 28 to 40. FIG. 28 is a schematic diagram illustrating a schematic configuration of an injector. FIG. 29 is a schematic diagram illustrating a schematic configuration of a needle. FIG. 30 is a schematic diagram illustrating a schematic configuration of a nozzle body. FIG. 31 is an enlarged view of the nozzle body. FIG. 32 is a flowchart illustrating an example of a manufacturing method for a needle. FIG. 33 is a flowchart illustrating an example of a manufacturing method for a nozzle body. FIGS. 34 to 39 are explanatory diagrams for describing the operation of the multifunctional processing apparatus 10B, respectively. FIG. 40 is a flowchart for describing the operation of the multifunctional processing apparatus 10B.

Here, a case of manufacturing an injector 600 illustrated in FIG. 28 using the multifunctional processing apparatus 10B is described in this embodiment. The injector 600 is manufactured by the processing by the multifunctional processing apparatus 10B and the processing by various other processing apparatuses. The injector 600 is an apparatus for injecting a fluid at a predetermined pressure or higher, and is used as a fuel injection mechanism of an internal combustion engine such as a diesel engine. The injector 600 includes a needle 602 and a nozzle body 604. The injector 600 has a configuration in which the needle 602 is inserted into a hollow portion of the nozzle body 604. The needle 602 is an elongated rod-like member as illustrated in FIG. 29. The nozzle body 604 has a configuration in which a hollow portion is formed therein and a plurality of injection holes 606 are formed at a tip to have a diameter smaller than a diameter of the hollow portion, as illustrated in FIGS. 30 and 31. The injection hole 606 is a hole that penetrates to the hollow portion from the outside. The multifunctional processing apparatus 10B of this embodiment can be used to manufacture the nozzle body 604.

First, the needle manufacturing method will be described with reference to FIG. 32. The needle manufacturing method manufactures a needle by cutting a rod-like member (step S12), performing a heat treatment after forming an outer shape of the needle (step S14), and polishing an outer surface as finishing processing (step S16). In addition, the manufacturing method measures an outer diameter of the outer shape of the manufactured needle, particularly, an outer diameter of a proximal portion of the tip. The needle may be manufactured by an apparatus other than the multifunctional processing apparatus 10B.

Next, the nozzle body manufacturing method will be described with reference to FIGS. 33 to 39. First, in the nozzle body manufacturing method, a workpiece is manufactured by casting or the like to have an outer shape similar to the shape of a nozzle body. In the manufacturing method, inner-diameter drilling is performed on the manufactured member (step S20) to form an internal space, electrochemical machining for inner-diameter counter boring is then performed on the workpiece (step S22), and a heat treatment is performed (step S24). In the nozzle body manufacturing method, the heat-treated workpiece is fixed to the stage 44, and is processed by the multifunctional processing apparatus 10B.

Figure 34:
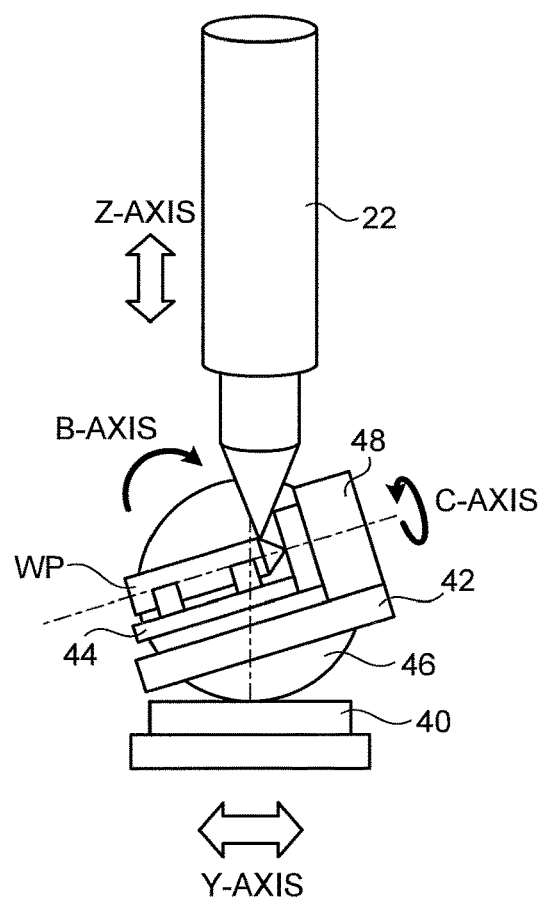
FIG. 34 is an explanatory diagram for describing an operation of the multifunctional processing apparatus.
Figure 35:
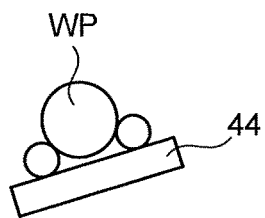
FIG. 35 is an explanatory diagram for describing an operation of the multifunctional processing apparatus.

The multifunctional processing apparatus 10B performs laser processing using the laser processing head 60 to form an injection hole in the fixed workpiece (step S26). Specifically, as illustrated in FIG. 34, the stage moving mechanism 42 adjusts the direction of the workpiece WP and moves the workpiece WP in a direction in which a portion for forming the injection hole of the workpiece WP is located higher than the end of the opposite portion in the Z-axis direction and a direction in which the center of the injection port hole to be formed is parallel to the Z-axis direction, whereby the laser processing is performed by the laser processing head 60 to form the injection hole in the workpiece WP. Moreover, the multifunctional processing apparatus 10B rotates the stage 44 around the C-axis using the C-axis rotating mechanism 48, and thus, as illustrated in FIG. 35, can rotate the workpiece WP around the axial center in a longitudinal direction thereof. The multifunctional processing apparatus 10B rotates the stage 44 around the C-axis using the C-axis rotating mechanism 48 and rotates the workpiece WP at a constant angle to perform the laser processing using the laser processing head 60, whereby the injection holes are formed at a plurality of locations. The multifunctional processing apparatus 10B rotates the stage 44 around the C-axis using the C-axis rotating mechanism 48 and forms the injection holes in the workpiece WP, whereby the injection holes can be formed on a concentric circle.

Figure 36:
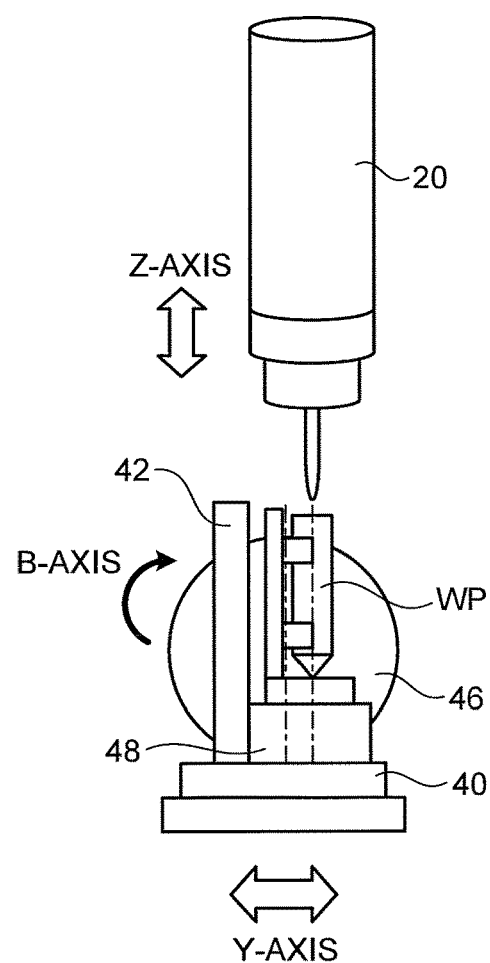
FIG. 36 is an explanatory diagram for describing an operation of the multifunctional processing apparatus.
Figure 37:
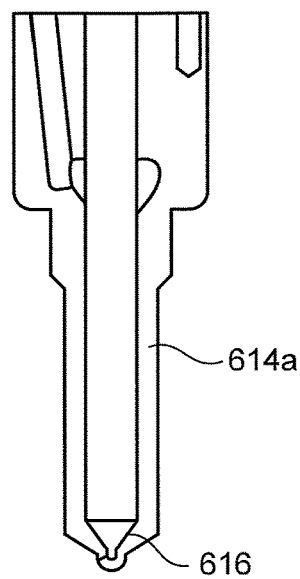
FIG. 37 is an explanatory diagram for describing an operation of the multifunctional processing apparatus.

After forming the injection port holes, the multifunctional processing apparatus 10B performs tip processing using the machining head 50 (step S28). Specifically, as illustrated in FIG. 36, the stage moving mechanism 42 adjusts the direction of the workpiece WP, and moves the workpiece WP in a direction in which the central axis (axis parallel to the longitudinal direction and passing through the center of the cross section) of the hollow portion of the workpiece WP is parallel to the Z-axis direction. Thereafter, the tool 56a is mounted onto the head body 54, then the tool 56a is inserted to the hollow portion, and thus the multifunctional processing apparatus 10B polishes the tip of the hollow portion using the grinding wheel surface. The head body 54 can perform the polishing by the rotation of the tool 56a around the central axis of the hollow portion, for example. Thus, as illustrated in FIG. 37, a tip 616 of the hollow portion of a workpiece 614a, that is, the tip 616 as a peripheral portion of a portion formed with the injection port holes 606 is in a state of being polished.

After performing the tip processing, the multifunctional processing apparatus 10B polishes an inner surface (step S30). The tool 56b is mounted onto the head body 54, then the tool 56b is inserted to the hollow portion, and thus the multifunctional processing apparatus 10B polishes the inner surface of the hollow portion using the grinding wheel surface. The head body 54 can perform the polishing by the rotation of the tool 56a around the central axis of the hollow portion, for example. Thus, as illustrated in FIG. 38, an inner surface 618 of the hollow portion of a workpiece 614b is in a state of being polished.

After polishing the inner surface, the multifunctional processing apparatus 10B performs fluid polishing as matching processing (step S32). Specifically, as illustrated in FIG. 39, the tool is mounted onto the head body 54, then a polishing fluid is supplied to the hollow portion of a workpiece 614c, and thus the multifunctional processing apparatus 10B performs finishing processing on the inner surface by polishing the inner surface.

After performing the fluid polishing as the matching processing, the multifunctional processing apparatus 10B measures an inner diameter (step S34). In the manufacturing method, after the inner diameter is measured, the workpiece (nozzle body) is removed from the multifunctional processing apparatus 10B, then performance evaluation is performed (step S36), and main processing is completed. The nozzle body not satisfying performance requirements by the performance evaluation is eliminated as a defective product, and the injector satisfying the performance can be manufactured. The needle and nozzle body manufactured as described above form the injector in such a manner that the needle is inserted into the nozzle body and other finishing is performed.

The multifunctional processing apparatus 10B can process the workpiece WP held in the stage 44, using both of the machining unit 20 and the laser processing unit 22. Thus, the workpiece WP can be processed while being maintained in the fixed state, and thus axial misalignment can be prevented from occurring between the laser-processed portion and the machined portion. In addition, by the rotation of the laser, the laser processing can be effectively performed.

Furthermore, since the multifunctional processing apparatus 10B includes the fiber laser light source 62 and the short-pulse laser light source 64, and can switch the laser to be irradiated using the switching mechanism 74, the laser to be used can be switched depending on the size, thickness, material, or the like of the workpiece. For this reason, the processing can be performed with high accuracy in a short time according to intended processing.

In addition, since the multifunctional processing apparatus 10B has the stage moving mechanism 42 that is a mechanism capable of rotating the workpiece WP on two axes orthogonal to each other, the workpiece WP can be processed in various directions while being maintained in a state of being held in the same stage 44.

Preferably, the multifunctional processing apparatus 10B corrects (changes) processing conditions based on the information of the manufactured needle and nozzle body. As illustrated in FIG. 40, the multifunctional processing apparatus 10B acquires measurement results of the inner diameter of the nozzle body (step S70), acquires measurement results of the outer diameter of the needle (step S72), and corrects the processing conditions based on a comparison of the measurement results (step S74), thereby completing main processing. Specifically, in order to reduce a time required for the step of the polishing treatment and the number of steps prior to the finishing, the cutting amount or the polishing amount is adjusted in each step. Thus, the time related to the manufacturing can be reduced, and a load applied to the tool can be also further reduced.

Here, various members other than the nozzle body can be used as a target of the workpiece WP. In addition, various materials can be also used as a material of the workpiece WP, and members made of, for example, Inconel (registered trademark), Hastelloy (registered trademark), stainless, ceramic, steel, carbon steel, heat-resistant steel, ceramics, silicon, titanium, tungsten, resin, plastics, or an Ni-based heat-resistant alloy can be used. Furthermore, as the workpiece WP, members can be also used which is made of fiber reinforced plastics such as carbon fiber reinforced plastics (CFRP), glass fiber reinforced plastics (GFRP), or glass-mat reinforced thermoplastics (GMT), an iron alloy other than steel, various metals such as an aluminum alloy, various composite materials, or the like.

Further, in the embodiment described above, the workpiece WP is moved in the Y-axis direction by the movable unit 14, and the machining head 50 and the laser processing head 60 are moved in the X-axis direction and the Z-axis direction; however, the invention is not limited thereto. The multifunctional processing apparatus 10B may move the workpiece WP in three directions of the X-axis, the Y-axis, and the Z-axis, and may move the machining head 50 and the laser processing head 60 in three directions of the X-axis, the Y-axis, and the Z-axis. Further, in this embodiment, the posture (direction and position in the rotational direction) of the workpiece WP is adjusted by the stage moving mechanism 42, but the posture of the machining head 50 and the laser processing head 60 may be adjusted.

As described in each of the above embodiments, the laser processing apparatus 10 can execute fine processing (fine hole processing, cutting, and the like) on the workpiece WP using the laser light L, and can form the tapered hole and the reverse tapered hole of a perfect circular shape and a non-circular shape. Therefore, for example, in conventional fields in which electric discharge machining is used, the laser processing apparatus 10 described in the above embodiments can be available.

In addition, the laser processing apparatus 10 of the above embodiment executes irradiation of two types of lasers with two laser processing heads, but is not limited thereto. The laser processing apparatus 10 is just enough to irradiate the short pulse laser. In addition, when another laser is used, the laser is not limited to the fiber laser, and can use various usable lasers. Further, the laser processing apparatus 10 may include a head for executing irradiation of the short-pulse laser and a head for executing a laser (fiber laser or a $CO_2$ laser) other than the short-pulse laser and may perform short-pulse laser processing and laser processing other than the short-pulse laser processing. In addition, a means of performing the processing (processing of a metal layer) other than the short-pulse laser processing is not limited to the laser processing, and may include machining (drilling or turning) and cutting.

REFERENCE SIGNS LIST

10 LASER PROCESSING APPARATUS
12 FRAME
14 MOVABLE UNIT
16 STAGE UNIT
22 LASER PROCESSING UNIT
24 CONTROLLER
30 Y-AXIS MOVING MECHANISM
34 X-AXIS MOVING MECHANISM
38 Z-AXIS MOVING MECHANISM
39 θY ROTATING MECHANISM
60 LASER PROCESSING HEAD
62 FIBER LASER LIGHT SOURCE
64 SHORT-PULSE LASER LIGHT SOURCE

100 FIRST OPTICAL SYSTEM
101 FIRST PRISM
102 SECOND PRISM
103 ACTUATOR
104 ACTUATOR
105 FIRST DRIVING DEVICE
200 SECOND OPTICAL SYSTEM
201 THIRD PRISM
202 FOURTH PRISM
203 ACTUATOR
204 ACTUATOR
205 SECOND DRIVING DEVICE
300 OPTICAL SYSTEM
400 ADJUSTMENT DEVICE
401 FIRST ADJUSTMENT SECTION
402 SECOND ADJUSTMENT SECTION
WP WORKPIECE

The invention claimed is:

1. A laser processing apparatus for processing a workpiece using laser light, comprising:
   a first optical system that includes a first prism and a second prism and receives the laser light output from a laser light source;
   a second optical system that includes a third prism and a fourth prism and receives the laser light from the first optical system;
   a condensing optical system that receives the laser light from the second optical system and condenses the laser light to guide the condensed laser light to the workpiece;
   a first driving device that rotates the first prism and rotates the second prism synchronously with the first prism;
   a second driving device that rotates the third prism and rotates the fourth prism synchronously with the third prism; and
   a controller that controls the first driving device and the second driving device such that the workpiece is irradiated with the laser light while the laser light turns around an optical axis of the condensing optical system, wherein
   the controller adjusts irradiation conditions of the laser light including an incidence position and an incidence angle of the laser light with respect to the workpiece, by rotating the first prism and the third prism together in a state of fixing a relative position between the first prism and the third prism in the rotational direction, and adjusting a relative position of the second prism with respect to the first prism and a relative position of the fourth prism with respect to the third prism in the rotational direction.

2. The laser processing apparatus according to claim 1, wherein
   the controller determines the relative position of the second prism with respect to the first prism in the rotational direction such that the incidence angle is a target angle, and rotates the first prism and the second prism together in a state of fixing the determined relative position.

3. The laser processing apparatus according to claim 1, wherein
   the controller rotates the fourth prism in one rotation of the third prism while changing the relative position with respect to the third prism.

4. The laser processing apparatus according to claim 1, further comprising a position adjustment device capable of adjusting a relative position between a condensing position of the condensing optical system and the workpiece in a direction parallel to the optical axis.

5. A laser processing method for processing a workpiece using laser light, comprising steps of:
   irradiating the workpiece with the laser light emitted from a laser light source through a first optical system including a first prism and a second prism, a second optical system including a third prism and a fourth prism, and a condensing optical system; and
   turning the laser light around an optical axis of the condensing optical system by rotating the first prism, the second prism, the third prism, and the fourth prism synchronously with each other, in the step of irradiating, wherein
   the step of turning the laser light includes adjusting irradiation conditions of the laser light including an incidence position and an incidence angle of the laser light with respect to the workpiece, by rotating the first prism and the third prism together in a state of fixing a relative position between the first prism and the third prism in the rotational direction, and adjusting a relative position of the second prism with respect to the first prism and a relative position of the fourth prism with respect to the third prism in the rotational direction.

6. The laser processing method according to claim 5, further comprising steps of:
   determining the relative position of the second prism with respect to the first prism in the rotational direction such that the incidence angle is a target angle; and
   rotating the first prism and the second prism together in a state of fixing the determined relative position.

7. The laser processing method according to claim 5, further comprising a step of rotating the fourth prism in one rotation of the third prism while changing the relative position with respect to the third prism.

8. The laser processing method according to claim 5, further comprising a step of adjusting a relative position between a condensing position of the condensing optical system and the workpiece in a direction parallel to the optical axis.

* * * * *